United States Patent
Miyagawa

(10) Patent No.: US 7,202,985 B2
(45) Date of Patent: Apr. 10, 2007

(54) INNER DRUM EXPOSURE APPARATUS

(75) Inventor: Ichirou Miyagawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/313,725

(22) Filed: Dec. 22, 2005

(65) Prior Publication Data

US 2006/0139717 A1    Jun. 29, 2006

(30) Foreign Application Priority Data

Dec. 28, 2004    (JP)    ............... 2004-381976

(51) Int. Cl.
  *G02B 26/08*    (2006.01)
  *B41J 2/435*    (2006.01)
(52) U.S. Cl. ............ 359/204; 359/201; 359/212; 359/222; 359/226; 359/495; 347/224
(58) Field of Classification Search ............... None
  See application file for complete search history.

(56) References Cited

U.S. PATENT DOCUMENTS 5,367,399 A * 11/1994 Kramer ............... 359/206
5,481,384 A * 1/1996 Kramer et al. ............... 359/17

FOREIGN PATENT DOCUMENTS

JP     A 5-27188    2/1993

* cited by examiner

*Primary Examiner*—James Phan
(74) *Attorney, Agent, or Firm*—Margaret A. Burke; Sheldon J. Moss

(57) ABSTRACT

An exposure process is executed by multi-beams divided by polarizing and combining laser beams (La, Lb) modulated based on an image signal so as to be emitted by a light source side optical system by using a polarized light beam splitter, and by converting the laser beams (La, Lb) emitted as right circular polarized light and left circular polarized light into mutually orthogonal linear polarized light by using a quarter wave plate arranged on a light path of a scanning portion, and thereafter transmitting through an optical element of uniaxial crystal. An appropriate image can be formed by setting a division width of beam spots on a scanning surface set by the optical element of uniaxial crystal such that scanning unevenness of an image formed on a scanning surface is within an allowable range even when changing resolution of the inner drum exposure apparatus.

17 Claims, 9 Drawing Sheets

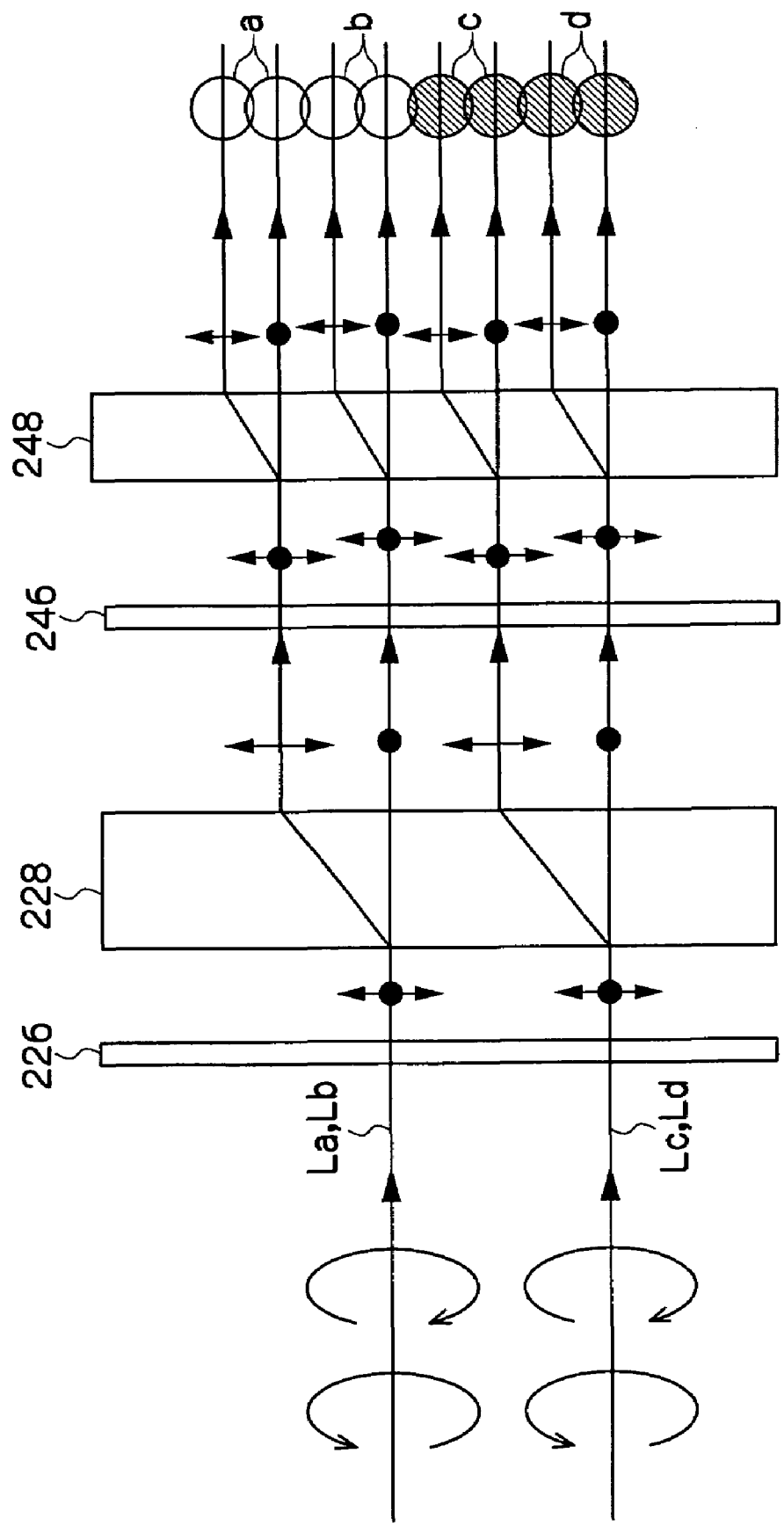

US 7,202,985 B2

INNER DRUM EXPOSURE APPARATUS

CROSS-REFERENCE TO RELATED APPLICATION

This application claims priority under 35 USC 119 from Japanese Patent Application No. 2004-381976, the disclosure of which is incorporated by reference herein.

BACKGROUND OF THE INVENTION

1. Field of the Invention

The present invention relates to an inner drum exposure apparatus (an inner surface scanning type light beam scanning exposure apparatus) for scanning a photosensitive surface arranged in an inner surface of a cylindrical drum by a scanning optical system of a light beam so as to executed an exposure process.

2. Description of the Related Art

Widely used is an inner drum exposure apparatus (an inner surface scanning type light beam scanning exposure apparatus) executing a scanning exposure process by introducing a light beam such as a laser beam or the like to a photosensitive surface of a recording medium arranged on an inner peripheral surface of a cylindrical drum by a light deflector. The recording medium on which an image is exposed and recorded is applied to an automatic developing machine as required, and a latent image formed on the recording medium is converted into a developed image. The inner drum exposure apparatus mentioned above is desired to be made of a multi-beam system for enabling a high speed exposure processing.

Conventionally, there is a technique of making the inner drum exposure apparatus in a multi-beam system with a method utilizing polarized light. The inner drum exposure apparatus of the method mentioned above combines respective light beams formed as two circular polarized lights in reverse rotating directions by using a light beam output portion in such a manner that respective optical axes coincide with each other, and outputs the combined light beam to a spinner side. The spinner changes a forward moving direction of the combined light beam to a direction toward an inner surface of the inner drum, by using a uniaxial crystal and a reflecting plate.

Further, there has been proposed a structure which scans a photosensitive recording paper on an inner surface of a drum so as to execute image recording, based on a plurality of light beams, by dividing a combined light beam into two light beams while changing an angle in correspondence to a rotating direction of circular polarized light, based on the function of a quarter wave plate and a uniaxial crystal (a Wollaston prism), and further integrally rotating the quarter wave plate, the uniaxial crystal and the reflecting plate serving as an optical element around a center axis by a main-scanning motor of a spinner or the like (for example, refer to Japanese Patent Application Laid-Open No. 5-27188)

Further, in an inner drum type multi-beam exposure system in the inner drum exposure apparatus, it is desirable to switch resolution of an image recorded on a recording medium. Accordingly, in order to structure the apparatus such that the resolution of the image can be switched, there can be considered a matter that a beam division width in a sub-scanning direction is made variable in correspondence to the resolution by rotationally adjusting the quarter wave plate and the uniaxial crystal (the Wollaston prism) installed on a rotation axis apparatus of the spinner so as to be integrally rotated around a direction of incidence of the light with respect to the rotation axis apparatus of the spinner.

However, if a mechanism for switching the resolution is installed on the rotation axis apparatus of a spinner required to rotate at an extremely high speed, such as some tens thousand revolutions per minute, the rotation axis apparatus of the spinner is enlarged in size and a weight thereof is increased. Accordingly, it is necessary to limit a rotational speed of the spinner rotation axis apparatus to a low speed, and there is generated a problem that a writing speed for scanning and exposing the photosensitive recording paper on the inner surface of the drum so as to record an image becomes slow.

SUMMARY OF THE INVENTION

The present invention is made by taking the problem mentioned above into consideration, and an object of the invention is to provide a new inner drum exposure apparatus which can execute a high speed exposure process and switch resolution while maintaining an initially set light beam division width in a sub-scanning direction.

In accordance with a first aspect of the invention, there is provided an inner drum exposure apparatus including: a light source side optical system for polarizing and combining two laser beams emitted from the light source side, each independently modulated based on an image signal, by using a polarized light beam splitter, and for changing said two laser beams to right circular polarized light and left circular polarized light so as to be emitted toward a reflection surface of a light deflector serving as a scanning portion; a quarter wave plate integrally arranged on the rotation axis of said light deflector provided with the reflection surface, for converting said two laser beams constituted by right circular polarized light and left circular polarized light input from said light source side optical system into mutually orthogonal linear polarized light; an optical element of uniaxial crystal that is integrally arranged on the rotation axis of said light deflector provided with the reflection surface, and emits said two laser beams converted into mutually orthogonal linear polarized light by said quarter wave plate at different respective positions enabling switching resolution within a narrow range of 10% or less, whereby a division width D3 of beam spots in a sub-scanning direction on a scanning surface is set according to the following expression:

$$D3=(D1+D2)/2\pm D4$$

wherein an interval of first beam spots corresponding to a first resolution is D1, an interval of second beam spots corresponding to a second resolution is D2 at a time of switching resolution within a narrow range of 10% or less, and a design tolerance in the sub-scanning direction is D4; and a sub-scan moving portion controlling so as to move said scanning portion in correspondence to the resolution.

Further, in accordance with a second aspect of the invention, there is provided an inner drum exposure apparatus including: a light source side optical system for polarizing and combining two laser beams emitted from the light source side, each independently modulated based on an image signal, by using a polarized light beam splitter, and for changing said two laser beams to right circular polarized light and left circular polarized light so as to be emitted toward a reflection surface of a light deflector serving as a scanning portion; a quarter wave plate integrally arranged on the rotation axis of said light deflector provided with the reflection surface, for converting said two laser beams constituted by right circular polarized light and left circular polarized light input from said light source side optical system into mutually orthogonal linear polarized light; an optical element of uniaxial crystal that is integrally arranged on the rotation axis of said light deflector provided with the reflection surface, formed by a prism-like quartz plate, and that divides said two laser beams converted into mutually orthogonal linear polarized lights by said quarter wave plate and emits an ordinary ray and an extraordinary ray in different angular directions enabling switching resolution within a narrow range of 10% or less, whereby a division width D3 of beam spots in a sub-scanning direction on a scanning surface is set according to the following expression:

$$D3=(D1+D2)/2 \pm D4$$

wherein an interval of first beam spots corresponding to a first resolution is D1, an interval of second beam spots corresponding to a second resolution is D2 at a time of switching the resolution within a narrow range of 10% or less, and design tolerance in the sub-scanning direction is D4; and a sub-scan moving portion controlling so as to move said scanning portion in correspondence to the resolution.

Further, in accordance with a third aspect of the invention, there is provided an inner drum exposure apparatus as recited in the first or second aspect, wherein a division width D3 of a beam spot on a scanning surface in a sub-scanning direction by an optical element of uniaxial crystal is set to 10.3 μm±0.3 μm.

In accordance with the structure mentioned above, even if the resolution is switched within a small width of 10% or less by the inner drum exposure apparatus, it is possible to form images by optimizing the division width of the beam on the scanning surface set by the optical element of uniaxial crystal in spite of manufacturing error of the division width, vibration in the sub-scanning direction, feeding speed change or the like. Accordingly, it is possible to execute a process of forming an appropriate image while keeping scanning unevenness of the image formed on the scanning surface within an allowable range. Further, since it is not necessary to install a mechanism for switching resolution on the rotation axial apparatus of the light deflector or the like, it is possible to set the rotational speed of the light deflector high, and it is possible to execute high speed exposure processing.

Further, in the case that the optical element of the uniaxial crystal is structured by a quartz plate, it is easy to process quartz with a sufficient precision, and it is possible to inexpensively manufacture with quartz. Accordingly, it is possible to provide an inexpensive apparatus. Further, quartz can easily structure the optical element of the uniaxial crystal having the desired function by utilizing a characteristic of a division width with respect to the angle of inclination of the crystal optical axis.

In accordance with a fourth aspect of the invention, there is provided an inner drum exposure apparatus as recited in any one of the first through third aspects, wherein in the case that the standard resolution is set to $2R_0$dpi and recording is executed by changing the resolution from $2R_0$dpi to $R_0$dpi, the same image information is exposed by two laser beams divided by the optical element of the uniaxial crystal as at the resolution of $2R_0$dpi.

In accordance with a fifth aspect of the invention, there is provided an inner drum exposure apparatus including: a light source side optical system for polarizing, combining, and emitting two laser beams emitted fro the light source side, each independently modulated based on an image signal, by using a polarized light beam splitter; a light deflecting portion arranged so as to deflection control a light beam on a light path of at least one said optical system in a plurality of said light source side optical systems; a combining member for combining a plurality of said light beams emitted from a plurality of said light source side optical systems, based on an effect of: reflecting a part of at least one of (a) the light beam deflection controlled by said light deflecting portion or (b) said other light beams emitted from the plurality of said light source side optical systems other than said deflection controlled light beam; and transmitting a part of said other light beam, (a) or (b); a light deflector for executing scanning exposure by forming images of a plurality of said light beams, combined by said combining member, on a recording medium mounted on a support body of the inner drum and at a predetermined interval from each other in the sub-scanning direction; at least one first quarter wave plate for converting a linear polarized light into right or left circular polarized light before being scanned by said light deflector, arranged at a rear side of said polarized light beam splitter; a second quarter wave pate that is arranged on a rotation axis of said light deflector provided with a reflection surface, and converts a laser beam obtained by coaxially combining the input right circular polarized light and left circular polarized light into mutually orthogonal linear polarized lights; an optical element of uniaxial crystal integrally arranged on the rotation axis of said light deflector provided with the reflection surface, and in which a division width D3, of beam spots in a sub-scanning direction on a scanning surface at a time of forming images of said two laser beams converted into mutually orthogonal linear polarized lights by said second quarter wave plate, is at a predetermined interval on said recording medium, for enabling the switching of resolution within a narrow range of 10% or less according to the following expression:

$$D3=(D1+D2)/2 \pm D4$$

wherein an interval of first beam spots corresponding to a first resolution is D1, an interval of second beam spots corresponding to a second resolution is D2 at a time of switching the resolution within a narrow range of 10% or less is D2, and design tolerance in the sub-scanning direction is D4; and a sub-scan moving portion controlling so as to move said light deflector in correspondence to the resolution.

In accordance with the structure mentioned above, even if the resolution is switched within a small width of 10% or less by the inner drum exposure apparatus, it is possible to form images by optimizing the division width of the beam on the scanning surface set by the optical element of the uniaxial crystal, in spite of manufacturing error of the division width, vibration in the sub-scanning direction, feeding speed change or the like. Accordingly, it is possible to execute a process of forming an appropriate image and keeping scanning unevenness of the image formed on the scanning surface within an allowable range. Further, since it is not necessary to install a mechanism for switching resolution on the rotation axial apparatus of the light deflector or the like, it is possible to set the rotational speed of the light deflector high, and it is possible to execute high speed exposure processing. Further, light beams, modulated based on an image signal, output from a plurality of optical systems at the light source side is introduced to the light deflector by combining the plurality of light beams output from the plurality of optical systems at the light source side by utilizing a combining member. Further, the light deflector forms images of the plurality of light beams, input from the combining member on the recording medium mounted to the support body of the inner drum, at a predetermined interval in the sub-scanning direction so as to execute the scanning exposure, whereby it is possible to execute high speed exposure processing by the multi-beam.

In accordance with a sixth aspect of the invention, there is provided an inner drum exposure apparatus as recited in the fifth aspect, wherein a division width D3 of a beam spot on a scanning surface in a sub-scanning direction by the optical element of uniaxial crystal is set to 20.6 µm±0.2 µm.

In accordance with a seventh aspect of the invention, there is provided an inner drum exposure apparatus including: a light source side optical system for polarizing, combining, and emitting two laser beams emitted from the light source side, each independently modulated based on an image signal, by using a polarized light beam splitter, thereby emitting; a light deflecting portion arranged so as to deflection control a light beam on a light path of at least one said optical system in a plurality of said light source side optical systems; a focusing lens for focusing the light beam deflection controlled by said light deflecting portion; a focusing lens for focusing the light beams emitted from a plurality of said light source optical systems other than said deflection controlled light beam; a partial optical function member arranged such that a focused position of the light beam deflection controlled by said light deflecting portion, and a focused position of a light beam emitted from the plurality of said light source side optical systems other than said deflection controlled light beam correspond to a reflection portion and a transmission portion of the partial function member which are set at different positions, reflecting at least one light beam by said reflection portion, and passing the other light beam by said transmission portion, thereby setting such that a light path of the light beam emitted from the plurality of said light source side optical systems other than said deflection controlled light beams, and a light path of said deflection controlled light beam are input to the scanning portion in a state of being parallel; a light deflector for executing a scanning exposure by forming images of the plurality of said light beams input through the light paths set by said partial optical function member on a recording medium mounted on a support body of an inner drum, at a predetermined interval to each other in the sub-scanning direction; at least one first quarter wave plate for converting a linear polarized light into right or left circular polarized light before being scanned by said light deflector, arranged at a rear side of said polarized light beam splitter; a second quarter wave pate that is arranged on a rotation axis of said light deflector provided with a reflection surface, and converts a laser beam obtained by coaxially combining input right circular polarized light and left circular polarized light into mutually orthogonal linear polarized lights; an optical element of uniaxial crystal integrally arranged on the rotation axis of said light deflector provided with the reflection surface, and in which a division width D3, of beam spots in a sub-scanning direction on a scanning surface at a time of forming images of said two laser beams converted into mutually orthogonal linear polarized lights by said second quarter wave plate at a predetermined interval on said recording medium, for enabling the switching of resolution within a narrow range of 10% or less, is set according to the following expression:

$$D3=(D1+D2)/2\pm D4$$

wherein an interval of first beam spots corresponding to a first resolution is D1, an interval of second beam spots corresponding to a second resolution is D2 at a time of switching the resolution within a narrow range of 10% or less, and design tolerance in the sub-scanning direction is D4; and a sub-scan moving portion controlling so as to move said light deflector in correspondence to the resolution.

In accordance with the structure mentioned above, even if the resolution is switched within a small width of 10% or less by the inner drum exposure apparatus, it is possible to form images by optimizing the division width of the beam on the scanning surface set by the optical element of the uniaxial crystal in spite of manufacturing error of the division width, vibration in the sub-scanning direction, feeding speed change or the like. Accordingly, it is possible to execute a process of forming an appropriate image by keeping scanning unevenness of the image formed on the scanning surface within an allowable range. Further, since it is not necessary to install a mechanism for switching the resolution on the rotation axial apparatus of the light deflector or the like, it is possible to set the rotational speed of the light deflector high, and it is possible to execute high speed exposure processing. Further, the light beam modulated based on the image signal output from a plurality of optical systems at the light source side is introduced to the light deflector by combining the plurality of light beams output from the plurality of optical systems at the light source side by utilizing the partial optical function member. Further, the light deflector forms images of the plurality of light beams, input from the partial optical function member on the recording medium mounted to the support body of the inner drum, at a predetermined interval in the sub-scanning direction so as to execute the scanning exposure, whereby it is possible to execute high speed exposure processing by the multi-beam.

In accordance with an eighth aspect of the invention, there is provided an inner drum exposure apparatus as recited in any one of the first to seventh aspects, wherein each of the light beams is divided approximately at a uniform light intensity in the sub-scanning direction by arranging a polarized light control element controlling the polarizing direction of each of the light beams, and a division element dividing each of the light beams passing through the polarized light control element in the sub-scanning direction.

In accordance with the structure mentioned above, it is possible to increase a quality of a pixel to be recorded ("a recording pixel" hereafter) by dividing each of the light beams such that the focused spots are overlapped adjacently approximately at the uniform light intensity in the sub-scanning direction, while using the polarized light control element and the division element, thereby forming each of the light beams as a spot shape which is closer to a rectangular shape with respect to the sub-scanning direction, and is in a focused and sharp state with respect to the main-scanning direction.

In accordance with a ninth aspect of the invention, there is provided an inner drum exposure apparatus as recited in any one of the first to seventh aspects, wherein a quarter wave plate, polarizing each of the light beams divided as linear polarized light (plane-polarized light) orthogonal to each other into right circular polarized light and left circular polarized light, and a uniaxial crystal, dividing the light beam of the right circular polarized light and the light beam of the left circular polarized light approximately at a uniform light intensity in the sub-scanning direction, are arranged at a downstream side of the light path from the optical element of the uniaxial crystal.

In accordance with the structure mentioned above, it is possible to increase a quality of recording pixels by dividing each of the light beams such that the focused spots are overlapped adjacently approximately at the uniform light intensity in the sub-scanning direction, while using the quarter wave plate and the uniaxial crystal, thereby forming each of the light beams as a spot shape which is closer to a rectangular shape with respect to the sub-scanning direction, and is in a focused and sharp state with respect to the main-scanning direction.

In accordance with the inner drum exposure apparatus of the invention, there can be obtained an effect of enabling high speed exposure processing and switching resolution within a narrow range while maintaining the initially set beam division width in the sub-scanning direction, without installing a mechanism for switching resolution on the rotation axis apparatus of the spinner or the like serving as the scanning portion.

BRIEF DESCRIPTION OF THE DRAWINGS

FIG. 9 is an explanatory view showing a structure of the separation element and the division element of the light beam attached to the spinner mirror apparatus used in the inner drum exposure apparatus in accordance with the second embodiment of the invention.

DETAILED DESCRIPTION OF THE INVENTION

Figure 1:
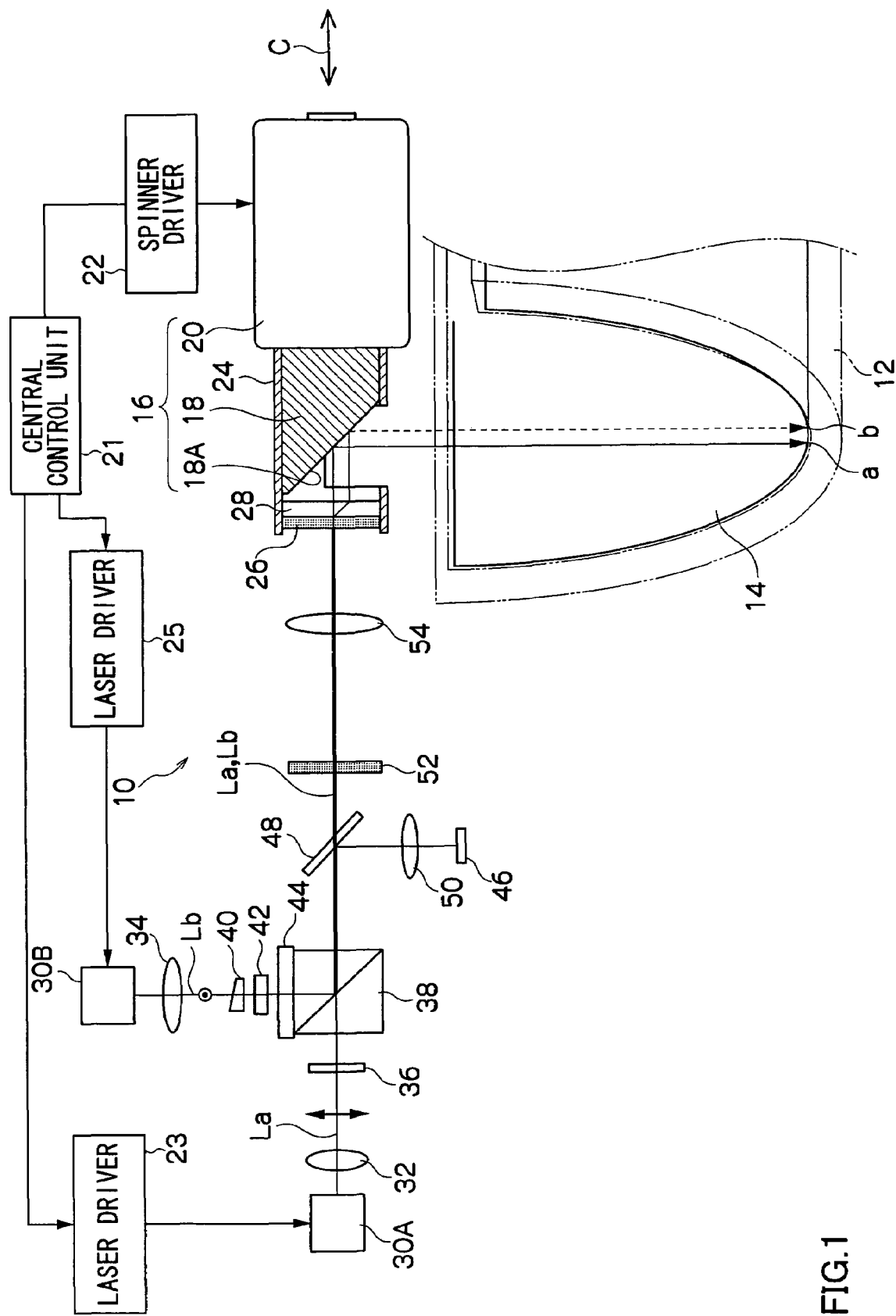
FIG. 1 is a schematic block diagram showing main portions of an inner drum exposure apparatus in accordance with a first embodiment of the present invention.

A description will be given of a first embodiment in accordance with an inner drum exposure apparatus of the present invention with reference to FIG. 1. As shown in the schematic block diagram in FIG. 1, an inner drum exposure apparatus 10 is structured by providing a support body 12 having a circular arc inner peripheral surface shape (a shape constituting a part of a cylindrical inner peripheral surface) as a base body, and a recording medium 14 (a photopolymer type, normal PS type or silver salt type photosensitive material or the like) is supported along an inner peripheral surface of the support body 12.

In this case, in the inner drum exposure apparatus 10, an unrecorded recording medium 14 is supplied by a supply and discharge apparatus (not shown) of the recording medium 14, an exposure process is executed after the recording medium 14 is securely brought into close contact with an inner peripheral surface of the support body 12 so as to be engaged and attached along the inner peripheral surface, and the recording medium 14 after the exposure process is executed is discharged to an external portion from the support body 12.

A spinner mirror apparatus 16 serving as a scanning portion (a light deflector) is arranged at a circular arc center position of the support body 12, in the inner drum exposure apparatus 10. The spinner mirror apparatus 16 is structured such that a cylindrical rotation axis member 18 can be rotated around a center axis serving as a rotation axis (coinciding with the circular arc center axis of the support body 12) by a motor 20 serving as a drive source.

A reflection mirror surface 18A forming an angle of 45 degree with respect to the rotation axis is formed in a leading end portion of the rotation axis member 18 of the spinner mirror apparatus 16. A movement of the spinner mirror apparatus 16 in an axial direction (a direction of an arrow C in FIG. 1) of the circular arc center axis of the support body 12 is controlled according to the resolution by a sub-scanning movement portion (not shown). A rotation of the motor 20 is controlled by a spinner driver 22 controlled by a central control unit 21.

As shown in FIG. 1, in order to conduct main-scanning ("main-scan" hereafter) of a recording surface of the recording medium 14 in accordance with a multi-beam method, the inner drum exposure apparatus 10 is provided with a light source side optical system projecting a multi-beam (a plurality of light beams) to the spinner mirror apparatus 16 side.

The light source side optical system is provided with first and second semiconductor laser light sources (LD) 30A and 30B (a light beam output portion) outputting laser beams La and Lb constituted by approximately linear polarized light after modulating the light intensity thereof, and a focusing optical system focusing the laser beams La and Lb respectively output from the first and second semiconductor laser light sources 30A and 30B on an exposure surface of the recording medium 14. As the first and second semiconductor laser light sources 30A and 30B, it is possible to employ a single transverse mode semiconductor laser having a high intensity of center light and having an intensity distribution that a light intensity is gradually lowered on moving away from the center.

Further, the inner drum exposure apparatus 10 is structured such as to main-scan on the recording surface of the recording medium 14 arranged on the inner peripheral surface of the support body 12 by dividing the beam.

A quarter wave plate 26 and an optical element 28 of uniaxial crystal are fixedly arranged in sequence from an upstream side of a light path, in a holder 24 firmly fixed to the rotation axis member 18 so as to integrally rotate, in the spinner mirror apparatus 16. The quarter wave plate 26 and the optical element 28 of uniaxial crystal may be structured such as to be overlapped and integrally adhered by a transparent adhesive agent for optical elements.

Figure 5:
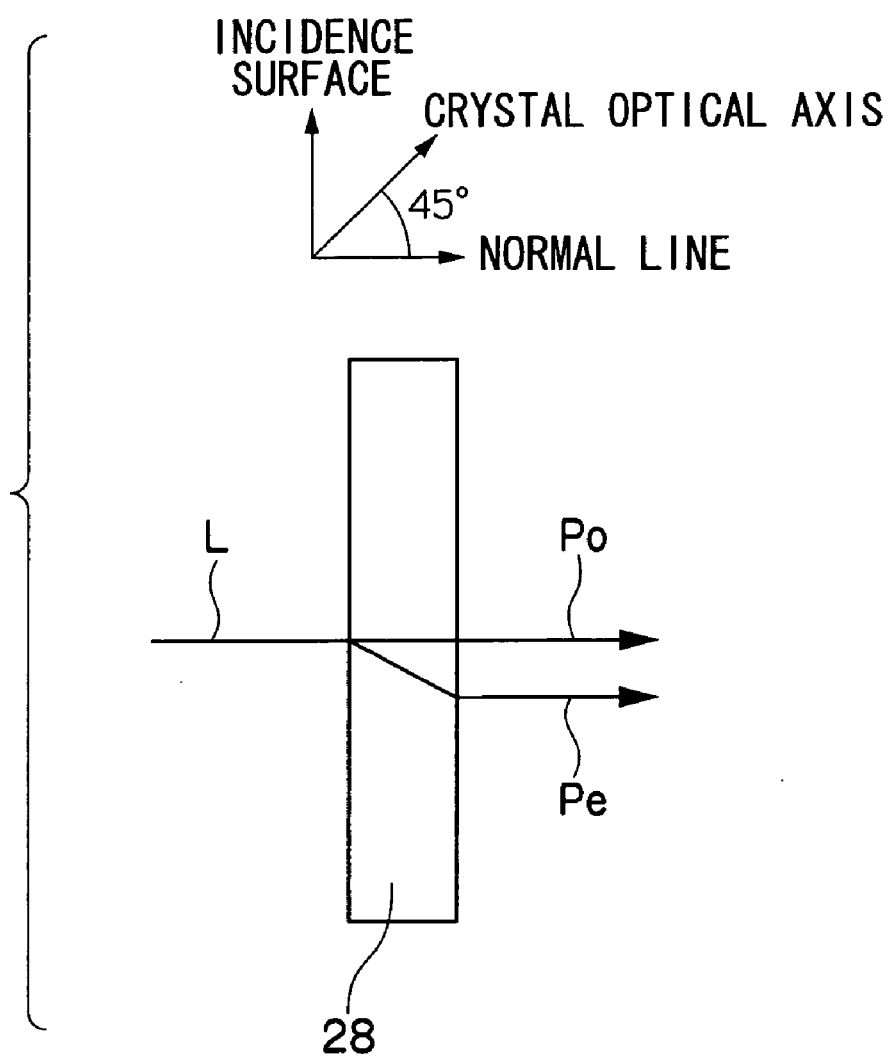
FIG. 5 is an explanatory view showing a structure of a separation element and a division element of a light beam attached to the spinner mirror apparatus used in the inner drum exposure apparatus in accordance with the second embodiment of the invention.

In this case, the optical element 28 of uniaxial crystal is structured, for example, such that the light beam is divided at a uniform light intensity into an ordinary ray Po and an extraordinary ray Pe, as shown in FIG. 5, at a time of inputting the circular polarized light beam, and the ordinary ray Po and the extraordinary ray Pe are shifted to be parallel to each other.

As shown in FIG. 1, the holder 24 is formed, for example, in a cylindrical shape, and an opening for passing the light beam reflected by a reflection mirror surface 18A to the recording medium 14 side is pierced therein.

In this case, the quarter wave plate 26 and the optical element 28 of the uniaxial crystal may be arranged in a forward light path of the reflection mirror surface 18A in the spinner mirror apparatus 16, and may be installed in such a manner so as to integrally rotate with the reflection mirror surface 18A by an independently provided support portion (not shown).

The quarter wave plate 26 can convert the light beam of each of right circular polarized light and left circular polarized light into light beams of linear polarized light orthogonal to each other.

The optical element 28 of the uniaxial crystal is structured, for example, by a quartz plate shifting in parallel one polarized beam of two mutually orthogonal linear polarized beams in the sub-scanning direction (outputting two parallel linear polarized light beams from respective different positions). In this case, as shown in FIG. 5, the optical element 28 of the uniaxial crystal is manufactured such that the crystal optical axis of the quartz is inclined at 45 degree with respect to the normal of the incident surface of the light on the crystal.

Figure 3:
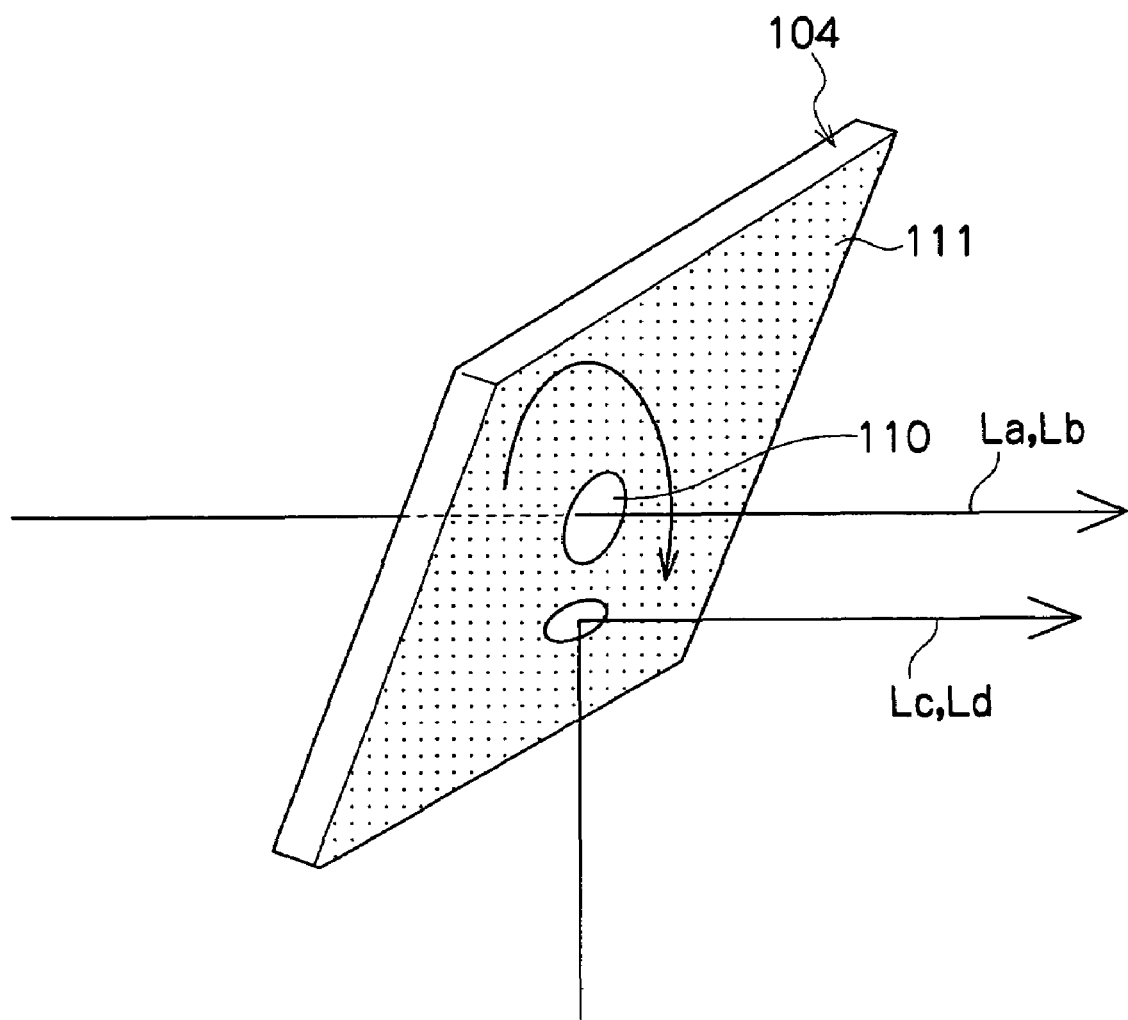
FIG. 3 is an enlarged perspective view showing by taking out a partial optical function member arranged on the light path from the light source to the spinner mirror apparatus which is used in the inner drum exposure apparatus in accordance with the second embodiment of the invention.

In the case of setting a precision of a division interval to ±0.1 µm, it is preferable to set a precision of thickness to about ±18 µm. Accordingly, it is easy to process the quartz plate in such a manner so as to have sufficient precision, and it is possible to inexpensively manufacture the quartz plate. Further, the quartz utilized as a material of the optical element 28 of the uniaxial crystal has the advantages of being a stable material and low cost. Further, since quartz has a characteristic division width with respect to the angle of incline of the optical axis of crystal as shown in FIG. 3, quartz can structure the optical element 28 of the uniaxial crystal having a desired function in accordance with this characteristic of quartz.

In this case, the optical element 28 of the uniaxial crystal may be structured by employing other uniaxial crystals than quartz as the material.

For example, the optical element 28 of the uniaxial crystal may be structured by using a uniaxial material such as calcite, lithium niobate or the like. In this case, since the thickness can be reduced in the case of using calcite, there is obtained an advantage that it is possible to reduce a weight, and it is possible to suppress limitations of a rotational speed of the spinner mirror apparatus 16. In this case, an adhered quarter wave plate 26 and optical element 28 of uniaxial crystal made of calcite may be used.

Since the inner drum exposure apparatus 10 in accordance with the present first embodiment is structured, for example, such that the inner drum exposure apparatus can be used by switching the resolution within a narrow range of about 10% from 2400 dpi to 2438 dpi, and further to 2540 dpi or the like, in accordance with the intended purpose, it is possible to improve the commercial value of the inner drum exposure apparatus.

The inner drum exposure apparatus 10 can execute a high speed exposure process by switching the resolution while maintaining an initially set beam division width in the sub-scanning direction, in a two multi-beam exposure system. In other words, in the inner drum exposure apparatus 10, two laser beams La and Lb divided and output by the optical element 28 of the uniaxial crystal are reflected by the spinner mirror apparatus 16 serving as the light deflector, and two laser beams La and Lb are focused at positions apart at a predetermined distance corresponding to one recording pixel in the sub-scanning direction on the scanning surface of the recording medium 14.

Further, the inner drum exposure apparatus 10 provided with the two multi-beam exposure system can be structured such that a scanning unevenness appearing in the exposed image is within an allowable range even if the resolution is switched.

Accordingly, in the inner drum exposure apparatus 10, it is preferable to set an interval between spots a and b formed by the laser beams La and Lb divided on the scanning surface by the optical element 28 of the uniaxial crystal installed to the spinner mirror apparatus 16 to an interval that no unevenness is seen.

For example, in the case that an interval between first beam spots a and b corresponding to the switched first resolution is D1, an interval between second beam spots a and b corresponding to the switched second resolution is D2, and an allowable error on a design tolerance in the sub-scanning direction is D4, a set interval D3 in the sub-scanning direction of the beam spots a and b is determined in accordance with an expression D3=(D1+D2)/2±D4.

For example, in the case that the interval between the beam spots a and b at a time of resolution of 2400 dpi is 10.6 µm and the interval between the beam spots a and b at a switched resolution of 2540 dpi is 10 µm, the interval between the beam spots a and b is set near 10.3 µm corresponding to the center of the interval between the beam spots a and b in the respective resolutions.

In other words, the inner drum exposure apparatus 10 can be used while switching the resolution within a narrow range, within the range of about 10%, for example, from 2400 dpi to 2438 dpi, further to 2540 dpi or the like in accordance with an intended purpose, by setting the division width of the beam on the scanning surface by the optical element 28 of the uniaxial crystal to 10.3 µm±0.3 µm.

Further, it is known by experiment and empirical rule that the scanning unevenness of the formed image is within the allowable range even if an interval error up to about 1 µm exists in the division width of the beam on the scanning surface. Accordingly, if a designed center value of the division width of the beam on the scanning surface by the optical element 28 of the uniaxial crystal is set to 10.3 µm, it is possible to execute a process of forming an image in an optimum manner even in the case that vibration in the sub-scanning direction, feeding speed variation or the like is generated.

Further, in the inner drum exposure apparatus 10, for example, the resolution is set to 2400 dpi ($2R_0$dpi) which is most often utilized for the exposure process as a standard. Further, for example, when changing the resolution from 2400 dpi ($2R_0$ dpi) to 1200 dpi ($R_0$dpi) for recording, the same image information is exposed by two laser beams La and Lb having the resolution of 2400 dpi ($2R_0$dpi) divided by the optical element 28 of the uniaxial crystal. And, the resolution may be set to 4800 dpi ($2R_0$dpi) as a standard, and the resolution may be changed from 4800 dpi ($2R_0$dpi) to 2400 dpi ($R_0$dpi) for recording.

Figure 6:
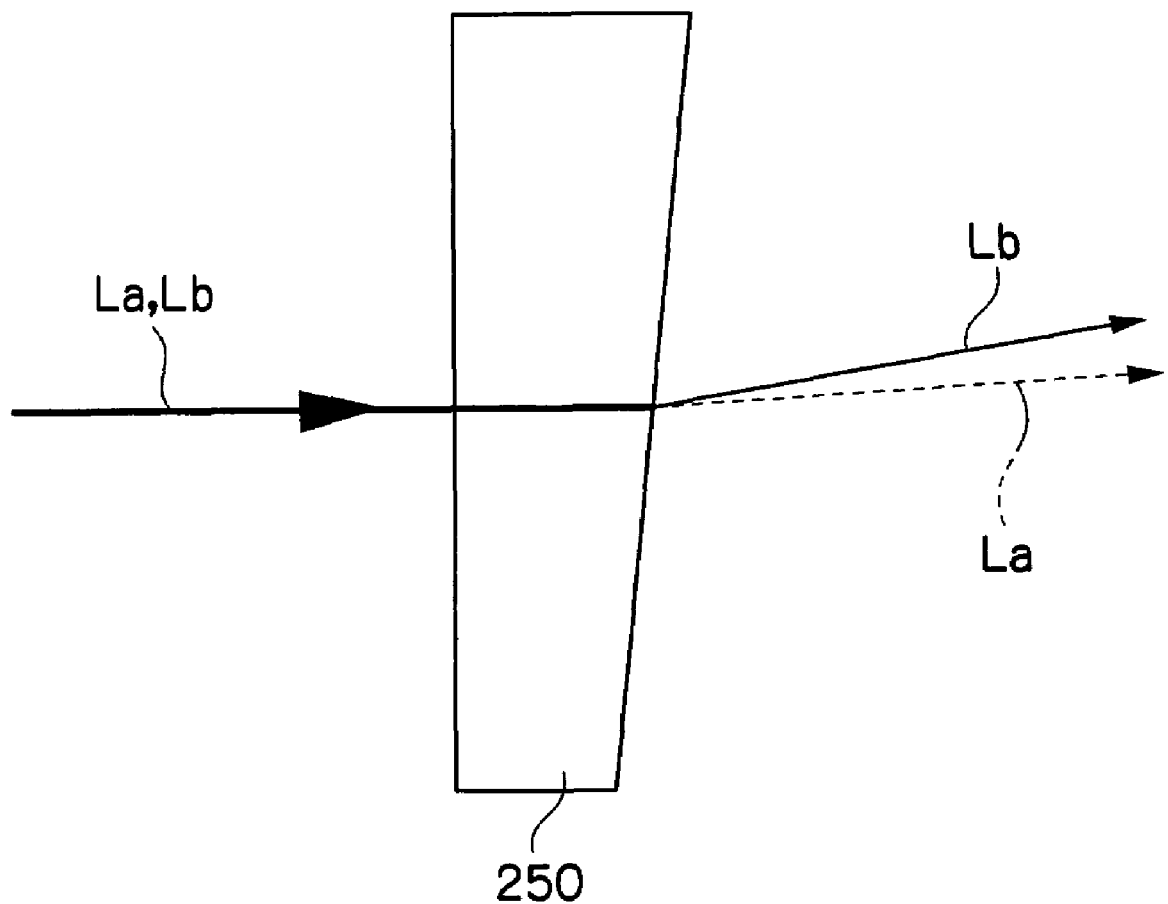
FIG. 6 is an explanatory view showing a characteristic of an optical element of a uniaxial crystal emitting and dividing the light beams in different angular directions which can be used in the inner drum exposure apparatus in accordance with the first or second embodiment of the invention.

Further, the description above is given of the optical element 28 of the uniaxial crystal dividing an input beam so as to emit two laser beams La and Lb in parallel, however, the optical element 28 of the uniaxial crystal may be structured, as shown in FIG. 6, such as to divide the input beam so as to emit two laser beams La and Lb in different angular directions by using one prism-like quartz plate 250.

At this time, the prism-like quartz plate 250 is structured such as to emit these laser beams La and Lb respectively in the different predetermined angular directions, so as to set the interval between the beam spots a and b focused on the scanning surface to the desired interval, when transmitting the laser beams La and Lb of two mutually orthogonal linear polarized lights by using the one quartz plate having a smaller refractive index anisotropy in comparison with calcite and formed in a prizm shape while suppressing the apex angle to a small value.

In other words, the prism-like quartz plate 250 has an axis having a high phase velocity and an axis having a low phase velocity within one of the faces, and is structured such as the other face is inclined with respect to the one face with the axis having the high phase velocity and the axis having the low phase velocity.

Further, in the inner drum exposure apparatus 10 utilizing the prism-like quartz plate 250, the light beams a and b emitted from the prism-like quartz plate 250 with a predetermined angle so as to be separated from each other are reflected by the light deflector (not shown), and two laser beams La and Lb are focused at the positions separated from each other at a predetermined interval corresponding to one recording pixel in the sub-scanning direction on the scanning surface so as be exposed.

As shown in FIG. 1, in order to execute the division of the light beam and to main-scan on the recording surface of the recording medium 14, the inner drum exposure apparatus 10 is provided with an optical system of projecting the light beam toward the spinner mirror apparatus 16 side from the light source side.

The inner drum exposure apparatus employs first and second semiconductor laser light sources 30A and 30B (light beam outputting portions). In other words, first and second semiconductor laser light sources 30A and 30B respectively emit the light beams (the laser beams) La and Lb of the linear polarized light, and change both the light beams La and Lb respectively to parallel beams by respective collimating lenses (collimator lenses) 32 and 34.

The first laser beam La emitted from the first semiconductor laser light source 30A is set to form a p-polarized light with respect to the reflection surface of a polarized light beam splitter 38, and passes through the polarized light beam splitter 38 after passing through a parallel flat plate 36.

Further, the second laser beam Lb passes through a quarter wave plate 44 after passing through two prisms 40 and 42 for adjusting an angle, whereby a direction of polarization is turned at 90 degree, and the second laser beam Lb is input to the polarized light beam splitter 38 after forming an s-polarized light with respect to the reflection surface of the polarized light beam splitter. Thereafter, the second laser beam Lb is reflected by the reflection surface of the polarized light beam splitter 38 after forming the s-polarized light, is coaxially combined with the first laser beam La, and proceeds along the same light path reaching the spinner mirror apparatus 16.

In the light source side optical system of the inner drum exposure apparatus 10, it is necessary to precisely compensate for displacement generated during assembling, adjusting and thereafter. This is because a problem is generated that the positional interval between the beam spots a and b on the scanning surface changes in correspondence to the angle of rotation of the light deflector if the coaxial combination between the first laser beam La and the second laser beam Lb is not precisely executed.

Accordingly, in the light source side optical system, a beam position detector (PSD) 46 is placed on the light path in the downstream side from the polarized light beam splitter 38. A beam splitter 48 is placed at a predetermined position on the light path in the downstream side from the polarized light beam splitter 38, thereby reflecting part of the light of the first laser beam La and the second laser beam Lb so as to focus it on the beam position detector (PSD) 46 placed at a corresponding position to the scanning surface by a focusing lens 50, and enabling detection of the positions of the first laser beam La and the second laser beam Lb on the scanning surface.

In this case, since it is required that the displacement of the beam spot position on the scanning surface is equal to or less than about 0.1 μm from the perspective of suppression of image unevenness, it is desirable to construct it such that the position change of the beam spot on the PSD is enlarged tenfold or more when taking the detecting and resolving power of the beam position detector (PSD) 46 into consideration.

The beam position in the beam position detector (PSD) 46 is detected by respectively illuminating the first laser beam La and the second laser beam Lb at predetermined light intensities to individually detect the beam positions at a time when exposure and recording is not applied to the recording medium. The beam position detector (PSD) 46 is provided with a circuit for dividing by a total light intensity, or a circuit for compensating in accordance with a calculation after acquiring the data, within a circuit board of the beam position detector (PSD) 46, in such a manner that no displacement is generated in the position information due to a light intensity difference between the first laser beam La and the second laser beam Lb, at a time of detecting the position.

In the inner drum exposure apparatus 10, angles of two prisms 40 and 42 for adjusting the angle placed on the light path of the second laser beam Lb are adjusted such that the position displacement between the first laser beam La and the second laser beam Lb becomes 0 or a predetermined value based on the position information detected by the beam position detector (PSD) 46 at a time when the exposure and recording is not applied to the recording medium.

In this case, the above-mentioned predetermined value is a value decided by previously exposing the recording medium before shipping the inner drum exposure apparatus 10, and it is set to a value such that no change is generated in the interval between the two beams in the main-scanning direction.

Further, the reason why there exist cases that the predetermined value is not equal to 0 is that the angles of reflection of the first laser beam La and the second laser beam Lb may be shifted in according to the precision of a flat surface particularly at a time of reflecting by the reflection mirror, in cases that the first laser beam La and the second laser beam Lb are shifted slightly in parallel. In other words, in the inner drum exposure apparatus 10, different angle displacements are generated in the light path after the second laser beam Lb is reflected by the polarized light beam splitter 38, and in the light path after the first laser beam La transmits, and it is necessary to compensate for the displacements. Accordingly, the parallel shift amount between the first laser beam La and the second laser beam Lb is adjusted close to 0 by adjusting the angle of incline by the parallel flat plate 36 arranged on the light path of the first laser beam La, at a time of assembling and adjusting the inner drum exposure apparatus 10.

The first laser beam La and the second laser beam Lb which are coaxially combined precisely in the manner mentioned above have applied beam shaping, astigmatic difference compensation to them by a cylinder lens group (not shown) arranged on the light path, and then pass through a quarter wave plate 52 arranged on the light path after being enlarged to a desired beam diameter by a beam expander.

The optical axis of the quarter wave plate 52 is inclined at 45 degree with respect to the direction of the linear polarization of the first laser beam La and the second laser beam Lb. Accordingly, the first laser beam La and the second laser beam Lb, which pass through the quarter wave plate 52 and are coaxially combined, are respectively converted into right circular polarized light and left circular polarized light, pass through a focusing lens 54 for forming a focal point on the scanning surface, goes approximately in parallel to a rotation axis of the reflection mirror surface 18A of the spinner mirror apparatus 16, and is introduced to the spinner mirror apparatus 16 of the scanning optical system mentioned above.

Further, the first laser beam La and the second laser beam Lb, formed as the right circular polarized light and the left circular polarized light input to the spinner mirror apparatus 16 of the scanning optical system from the light source side optical system, pass through the quarter wave plate 26 placed on the rotation axis 18 of the spinner mirror apparatus 16, thereby being input to the optical element 28 of the uniaxial crystal after being converted into liner polarized light beams orthogonal to each other.

The first laser beam La and the second laser beam Lb converted into the mutually orthogonal linear polarized light beams are reflected by the reflection mirror surface 18A of the light deflector after being shifted in parallel in the sub-scanning direction at a time of passing through the optical element 28 of the uniaxial crystal of the scanning optical system, and are focused at the positions separated from each other at the predetermined distance corresponding to one recording pixel in the sub-scanning direction on the scanning surface of the recording medium 14.

Further, the inner drum exposure apparatus 10 is provided with a laser driver 23 for a first semiconductor laser light source 30A, and a laser driver 25 for a second semiconductor laser light source 30B. Further, respective image signals independently generated by the central control unit 21 are transmitted to the respective laser drivers 23 and 25. The laser drivers 23 and 25 respectively control so as to drive the first semiconductor laser light source 30A and the second semiconductor laser light source 30B, emit the first laser beam La and the second laser beam Lb modulated based on the corresponding image signals, and irradiate on the scanning surface of the recording medium 14 by the light source side optical system and the spinner mirror apparatus 16 of the scanning optical system.

At the same time, the central control unit 21 transmits the control signal to the spinner driver 22 as mentioned above, so as to control the rotation of the motor 20 and rotate the reflection mirror surface 18A reflecting the first laser beam La and the second laser beam b input to the reflection mirror surface 18A of the scanning optical system from the light source optical system so as to apply the scanning exposure in the main-scanning direction to the recording medium 14. Further, the central control unit 21 transmits the control signal to the spinner driver 22. The spinner driver 22 receiving the control signal controls a sub-scan moving portion (not shown), and moves and scans the spinner mirror apparatus 16 at a uniform speed in an axial direction (a direction of an arrow C corresponding to a lateral direction when facing FIG. 1) of the circular arc center axis of the support body 12. Further, it executes a process of recording a two-dimensional image with respect to the entire surface of the recording surface of the recording medium 14 by moving the spinner mirror apparatus 16 in the sub-scanning direction while executing the scanning exposure in the main-scanning direction by the spinner mirror apparatus 16.

Next, a description will be given of the functioning and operation of the inner drum exposure apparatus in accordance with the present first embodiment.

In the inner drum exposure apparatus 10, the first laser beam La modulated and output in correspondence to the image information by the first semiconductor laser light source 30A controlled by the central control unit and the laser driver is formed as the parallel beam by the collimating lens (the collimator lens) 32 so as to be passed through the parallel flat plate 36, and is thereafter input to the polarized light beam splitter 38. At this time, since the first laser beam La is formed as the p-polarized light with respect to the reflection surface of the polarized light beam splitter 38, the first laser beam La goes through the polarized light beam splitter 38.

Further, the second laser beam Lb modulated and output in correspondence to the image information by the second semiconductor laser light source 30B is formed as the parallel beam by the collimating lens (the collimator lens) 34 so as to be passed through two prisms 40 and 42 for adjusting the angle, is thereafter formed as the s-polarized light by passing through the half wave plate 44 so as to be rotated at 90 degree in the direction of polarization, and is thereafter input to the polarized light beam splitter 38.

Further, the second laser beam Lb, formed as the s-polarized light so as to be reflected by the reflection surface of the polarized light beam splitter 38, is coaxially combined with the first laser beam La, and proceeds on the same optical path reaching the spinner mirror apparatus 16.

The first laser beam La and the second laser beam Lb coaxially combined in the manner mentioned above pass through the quarter wave plate 52, are respectively converted into the right circular polarized light and the left circular polarized light so as to pass through the focusing lens 54 for forming the focal point on the scanning surface, and introduced to the spinner mirror apparatus 16 of the scanning optical system provided with the quarter wave plate 26 and the optical element 28 of the uniaxial crystal.

Further, the first laser beam La and the second laser beam Lb converted into the right circular polarized light and the left circular polarized light are converted into the mutually orthogonal liner polarized light beams so as to be input to the optical element 28 of the uniaxial crystal at a time of passing through the quarter wave plate 26 of the scanning optical system, divided so as to shift in parallel providing two mutually orthogonal linear polarized light beams in the sub-scanning direction, thereafter introduced along the rotation axis of the spinner mirror apparatus 16, and reflection polarized by the reflection mirror surface 18A so as to be introduced to the recording medium 14.

Further, in the inner drum exposure apparatus provided with the two multi-beam exposure system in accordance with the present first embodiment, when recording by setting the resolution to a standard resolution of, for example, 2400 dpi and changing the resolution from 2400 dpi to 1200 dpi, the same image information is exposed by the two laser beams La and Lb. Further, the speed for moving the spinner mirror apparatus 16 in the sub-scanning direction is changed and adjusted so as to correspond to the resolution at that time.

Next, a description will be given of a second embodiment in accordance with the inner drum exposure apparatus of the invention with reference to FIGS. 2 to 8. In the second embodiment, the inner drum exposure apparatus 10 is structured such as to main-scan on the recording surface of the recording medium 14 arranged on the inner peripheral surface of the support body by four light beams.

A quarter wave plate 226 and an optical element 228 of a uniaxial crystal are fixedly arranged in sequence from the upstream side of the light path, in the holder 24 firmly fixed to the rotation axis member 18 so as to integrally rotate, in the spinner mirror apparatus 16.

Also, the quarter wave plate 226 and the optical element 228 of the uniaxial crystal may be arranged forward on the light path of the reflection mirror surface 18A in the spinner mirror apparatus 16, and may be structured such as to be integrally rotated with the reflection mirror surface 18A by the independently provided support portion (not shown).

The quarter wave plate 226 is structured such as to enable to convert each of the light beams formed as right circular polarized light and left circular polarized light into light beams of the linear polarized light orthogonal to each other.

The optical element 228 of the uniaxial crystal is equivalent to the structure exemplified in FIG. 5 mentioned above, and is structured by a quartz plate shifting in parallel two mutually orthogonal linear polarized light beams in the sub-scanning direction. The quartz plate is manufactured as a structure in which the crystal optical axis of the quartz is inclined at 45 degrees with respect to the normal of the incident surface of light on the crystal.

Also, the optical element 228 of the uniaxial crystal may be structured such as to emit and divide respective laser beams in different angular directions by employing one prism-like quartz plate 250, as shown in FIG. 6 mentioned above.

In the inner drum exposure apparatus 10 in accordance with the second embodiment, the structure is made such that a high speed exposure process can be executed by switching the resolution while maintaining the beam division width in the initially set sub-scanning direction, in a four multi-beam exposure system. Accordingly, in the inner drum exposure apparatus 10, two sets of two laser beams, totally four laser beams La, Lb, Lc and Ld emitted by being divided from the optical element 228 of the uniaxial crystal are reflected by the spinner mirror apparatus 16 serving as the light deflector, and four laser beams La, Lb, Lc and Ld are focused and exposed at respective positions mutually separated at a predetermined distance corresponding to one recording pixel in the sub-scanning direction on the scanning surface of the recording medium 14.

Further, the inner drum exposure apparatus 10 is structured such that scanning unevenness appearing on the image obtained by focusing four laser beams La, Lb, Lc and Ld to the respective positions apart at the predetermined interval corresponding to one recording pixel in the sub-scanning direction, on the scanning surface of the recording medium 14, is within an allowable range even if the resolution is switched.

Accordingly, the inner drum exposure apparatus 10 is structured such that the interval between the spots a and b obtained by the laser beams La and Lb and the interval between the spots c and d obtained by the laser beams Lc and Ld which are divided on the scanning surface by the optical element 228 of the uniaxial crystal attached to the spinner mirror apparatus 16 to an interval are set such that no unevenness appears. In this case, the interval between the spot a obtained by the laser beam La and the spot c obtained by the laser beam Lc is set to a predetermined interval in which no unevenness appears, by controlling an acousto-optic element 116 and an acousto-optic element 118.

For example, in the case that an interval of the scanning line corresponding to the switched first resolution is D1, an interval of the scanning line corresponding to the second resolution is D2, and an allowable error on a design in the sub-scanning direction is D4, a set interval D3 in the sub-scanning direction between the set of the beam spots a and b and the set of the beam spots c and d, which are focused on the scanning surface by dividing the set of the laser beams La and Lb and the set of the laser beams Lc and Ld by the optical element 228 of the uniaxial crystal is set by determining in accordance with an expression D3=(D1+D2)/2±D4. Since the interval at a time of scanning by the set of the beam spots a and b and the set of the beam spots c and d on the scanning surface comes into question, the distance component in the sub-scanning direction is set to the set interval D3, for example, even in a case that the beam spots a and b are positioned diagonally with respect to the sub-scanning direction on the scanning surface.

In the inner drum exposure apparatus 10, for example, in the case that the interval of the scanning line at a resolution of 1200 dpi is 21.2 µm, and the interval of the scanning line at a resolution of 1270 dpi after switching is 20.0 µm, the interval between the beam spots a and b which are divided and focused by the optical element 228 of the uniaxial crystal and the interval between the beam spots c and d are set close to 20.6 µm. In other words, the division width of the beams on the scanning surface obtained by the optical element 228 of the uniaxial crystal is set to 20.6 µm±0.2 µm.

In the inner drum exposure apparatus 10 mentioned above, since it is known by experiment and empirical rule that even if an interval error up to about 1 µm exists in the division width of the beam on the scanning surface, scanning unevenness of the formed image is within an allowable range, and it is possible to execute a process of forming the image in an optimum manner by setting the design center value of the division width of the beam on the scanning surface by the optical element 28 of the uniaxial crystal to 20.6 µm even if manufacturing error in the division width, vibration in the sub-scanning direction, feeding speed changes or the like exist.

Figure 2:
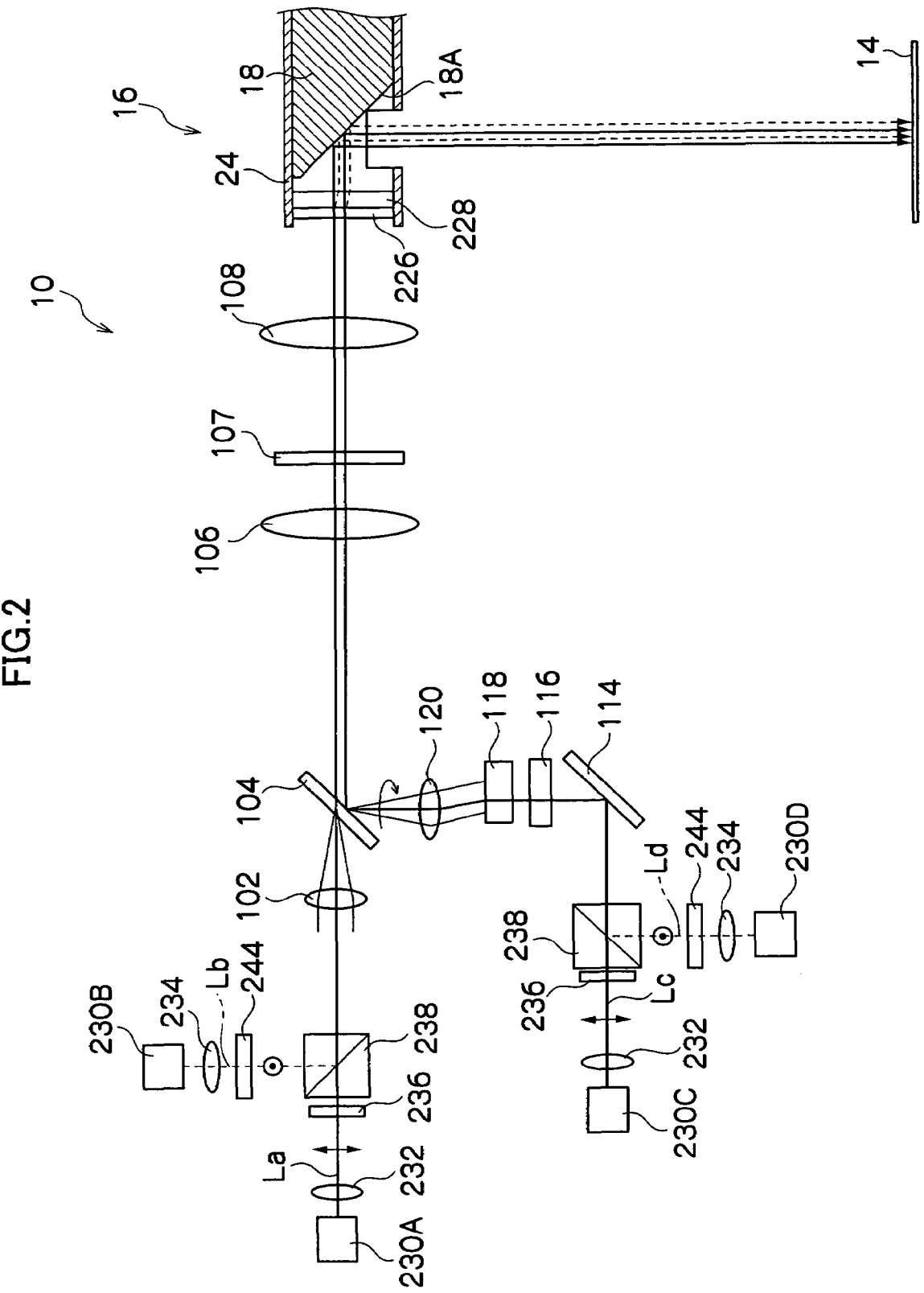
FIG. 2 is an explanatory view showing an outline of a structure of a light path from a light source to a spinner mirror apparatus which is used in an inner drum exposure apparatus in accordance with a second embodiment of the invention.

As shown in FIG. 2, in order to main-scan on the recording surface of the recording medium 14 by dividing the combined light beam, the inner drum exposure apparatus 10 is provided with a light source side optical system projecting the light beam for inputting to the spinner mirror apparatus 16.

The inner drum exposure apparatus 10 employs first, second, third and fourth semiconductor laser light sources 230A, 230B, 230C and 230D (light beam output portions). Further, the first and second semiconductor laser light sources 230A and 230B and the third and fourth semiconductor laser light sources 230C and 230D are structured as independent sets of light systems.

The set of the first and second semiconductor laser light sources 230A and 230B respectively emit the linear polarized light beams (the laser beams) La and Lb. In the optical systems, both the light beams La and Lb are changed to parallel beams by collimating lenses (collimator lenses) 232 and 234.

The first laser beam La emitted from the first semiconductor laser light source 230A is set such as to form p-polarized light with respect to a reflection surface of a polarized light beam splitter 238, and proceeds on the optical path through the polarized light beam splitter 238 after passing through a parallel flat plate 236.

Further, the second laser beam Lb passes through a half wave plate 244, whereby a direction of polarization is turned through 90 degree, and the second laser beam Lb is input to the polarized light beam splitter 238 after forming an s-polarized light. Further, the second laser beam Lb is reflected by the reflection surface of the polarized light beam splitter 238 after forming the s-polarized light, is coaxially combined with the first laser beam La, and proceeds on the same light path.

In such a manner, the first laser beam La and the second laser beam Lb which are emitted from the polarized light beam splitter 238, polarized and coaxially combined are input to the spinner mirror apparatus 16 through the optical path structured by in order arranging a second focusing lens 102, a partial optical function member 104, a third focusing lens 106, a quarter wave plate 107 and a fourth focusing lens 108.

The partial optical function member 104 is structured such as to introduce one light beam, which has been emitted from the first and second semiconductor laser light sources 230A and 230B so as to be polarized and coaxially combined, and the other light beam, which has been emitted from the third and fourth semiconductor laser light sources 230C and 230D mentioned below so as to be polarized and coaxially combined, to the spinner mirror apparatus 16 by passing the one light beam therethrough, and to introduce the other light beam to the spinner mirror apparatus 16 by reflecting the other light beam.

In other words, as shown in FIGS. 2 and 3, the partial optical function member 104 is structured such as to introduce the light beam, which has been emitted from the first and second semiconductor laser light sources 230A and 230B so as to be polarized and coaxially combined, to the spinner mirror apparatus 16 by passing the light beam therethrough, and introduce the light beam, which has been emitted from the third and fourth semiconductor laser light sources 230C and 230D so as to be polarized and coaxially combined, to the spinner mirror apparatus 16 by reflecting the light beam.

Accordingly, the partial optical function member 104 forms a circular transparent portion in a front view under an inclined state at a predetermined angle, as a transmission portion 110 passing a laser beam La irradiated from the first semiconductor laser light source 30A therethrough, in a center portion thereof. Further, a reflection portion (a reflection surface) 111 is formed on the entire surface except for the transmission portion 110 (or a predetermined range around the transmission portion 110) in the partial optical function member 104. In this case, the partial optical function member 104 shown in FIGS. 1 to 3 can employ various structures such the entirety thereof being formed by a transparent glass plate, while the entire surface except for the center transmission portion 110 being formed as a mirror surface, and the like. Or, the transmission portion 110 may be formed as an opening.

Further, the partial optical function member 104 is arranged such that the transmission portion 110 is at the image forming position of the second focusing lens 102, and the reflection portion 111 is at the image forming position of the second focusing lens 120.

Also, the partial optical function member 104 may be structured by a combined member corresponding to an optical member which reflects at least a part of the one light beam and passes at least a part of the other light beam, such as a half mirror or the like. Further, in the case of using a half mirror, the focusing lens for focusing to the partial optical function member need not be employed.

The set of the third and fourth semiconductor laser light sources 230C and 230D respectively emit the linear polarized light beams (the laser beams) Lc and Ld. In the sets of optical systems, both the light beams Lc and Ld are respectively formed as parallel beams by the collimating lenses (the collimator lenses) 232 and 234.

The third laser beam Lc emitted from the third semiconductor laser light source 230C is set so as to form the p-polarized light with respect to the reflection surface of the polarized light beam splitter 238, and proceeds on the optical path through the polarized light beam splitter 238 after passing through the parallel flat plate 236.

Further, the fourth laser beam Ld passes through the half wave plate 244, whereby the direction of polarization is turned by 90 degrees, and the fourth laser beam Ld is input to the polarized light beam splitter 238 after forming s-polarized light. Further, the fourth laser beam Ld is reflected by the reflection surface of the polarized light beam splitter 238 after forming the s-polarized light, coaxially combined with the third laser beam Lc, and emitted from the polarized light beam splitter 238 so as to proceed on the same light path.

In the manner mentioned above, the third laser beam Lc and the fourth laser beam Ld, which are emitted from the polarized light beam splitter 238, polarized and coaxially combined, are input to the spinner mirror apparatus 16 through the optical path structured by arranging in sequence the acousto-optic element 116 corresponding to the light polarizing portion polarizing in an X direction with respect to the spinner mirror apparatus, the acousto-optic element 118 corresponding to the light polarizing portion polarizing in a Y direction, a second focusing lens 120, and commonly used partial optical function member 104, third focusing lens 106, quarter wave plate 107 and fourth focusing lens 108.

Figure 8:
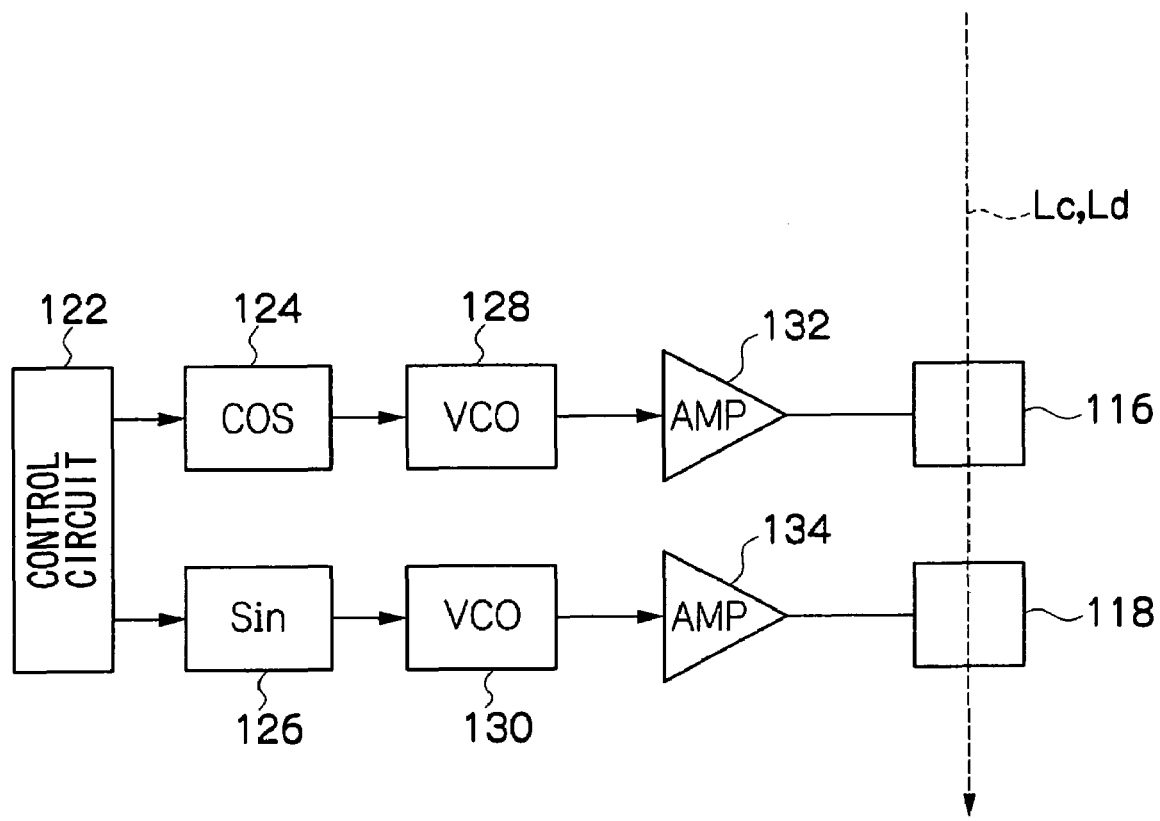
FIG. 8 is an explanatory view showing a structure of the light polarization portion polarizing in the direction of the X axis and the direction of the Y axis which is used in the inner drum exposure apparatus in accordance with the second embodiment of the invention.

The acousto-optic element 116 and the acousto-optic element 118 corresponding to the light polarizing portion are controlled by a circuit shown in FIG. 8. The circuit serving as the control portion is provided with a control circuit 122 generating a control clock signal based on a signal from an encoder (not shown) provided in the spinner mirror apparatus 16, a cosine wave signal generating circuit 124 generating a cosine wave voltage signal in accordance with the control clock signal, a sine wave signal generating circuit 126 generating a sine wave voltage signal in accordance with the control clock signal, a voltage control oscillator 128 generating a frequency modulation signal based on the cosine wave voltage signal, a voltage control oscillator 130 generating a frequency modulation signal based on the sine wave voltage signal, an amplifier 132 amplifying the frequency modulation signal from the voltage control oscillator 128 so as to supply to the acousto-optic element 116, and an amplifier 134 amplifying the frequency modulation signal from a voltage control oscillator 130 generating a frequency modulation signal based on the sine wave signal so as to be supplied to the acousto-optic element 118.

In this case, in the present second embodiment mentioned above, the acousto-optic element 116 and the acousto-optic element 118 serving as the light polarizing portion are structured as independent bodies, however, the light polarizing portion may be integrally structured such as to achieve the polarization in the X and Y directions by means of one acousto-optic element. Further, an electro-optic device or the like may be employed in place of using the acousto-optic element.

In the optical system in the side of the set of the third and fourth semiconductor laser light sources 230C and 230D structured in the above mentioned manner, the light beams polarized and coaxially combined, output from the third and fourth semiconductor laser light sources 230C and 230D side are polarized by the acousto-optic element 116 and the acousto-optic element 118 serving as the light polarizing portions controlled by the control portion, and forms an image on the reflection portion 111 of the partial optical function member 104 by the second focusing lens 120 so as to be reflected. The light beams are formed parallel to the light beams which are emitted from the first and second semiconductor laser light sources 230A and 230B by the third focusing lens 106 so as to be polarized and coaxially combined, are focused by the fourth focusing lens 108 so as to be reflected by the reflection mirror surface 18A of the spinner mirror apparatus 16, and form an image on the recording medium 14, whereby scanning exposure is executed.

At a time of executing the scanning exposure, the circuit serving as the control portion (not shown) controls the acousto-optic element 116 and the acousto-optic element 118 serving as the light polarizing portions so as to polarize, whereby the inner drum exposure apparatus 10 appropriately executes the scanning exposure in the main-scanning direction by interlocking the light beam polarized and coaxially combined, output from the third and fourth semiconductor laser light sources 230C and 230D side with the operation of the spinner mirror apparatus 16.

Accordingly, the control circuit (not shown) serving as the control portion supplies the control clock signal to the cosine wave signal generating circuit 124 shown in FIG. 8, based on the position signal from an encoder (not shown) provided in the spinner mirror apparatus 16. The cosine wave voltage signal output from the cosine wave signal generating circuit 124 is converted into the frequency modulation signal by the voltage control oscillator 128, and is thereafter supplied to the acousto-optic element 116 via the amplifier 132. In this case, the acousto-optic element 116 polarizes the light beam polarized and coaxially combined, output from the third and fourth semiconductor laser light sources 230C and 230D side in the X direction (a direction of incline passing through a center of the reflection mirror surface 18A) based on the cosine wave voltage signal.

Further, the control circuit serving as the control portion supplies the control clock signal to the sine wave signal generating circuit 126. The sine wave voltage signal output from the sine wave signal generating circuit 126 is converted into the frequency modulation signal by the voltage control oscillator 130, and is thereafter supplied to the acousto-optic element 118 via the amplifier 134. In this case, the acousto-optic element 118 polarizes the second laser beam Lb modulated in the X direction by the acousto-optic element 116 based on the sine wave voltage signal in the Y direction (a direction orthogonal to the direction of incline passing through the center of the reflection mirror surface 18A) based on the sine wave voltage signal.

Figure 7:
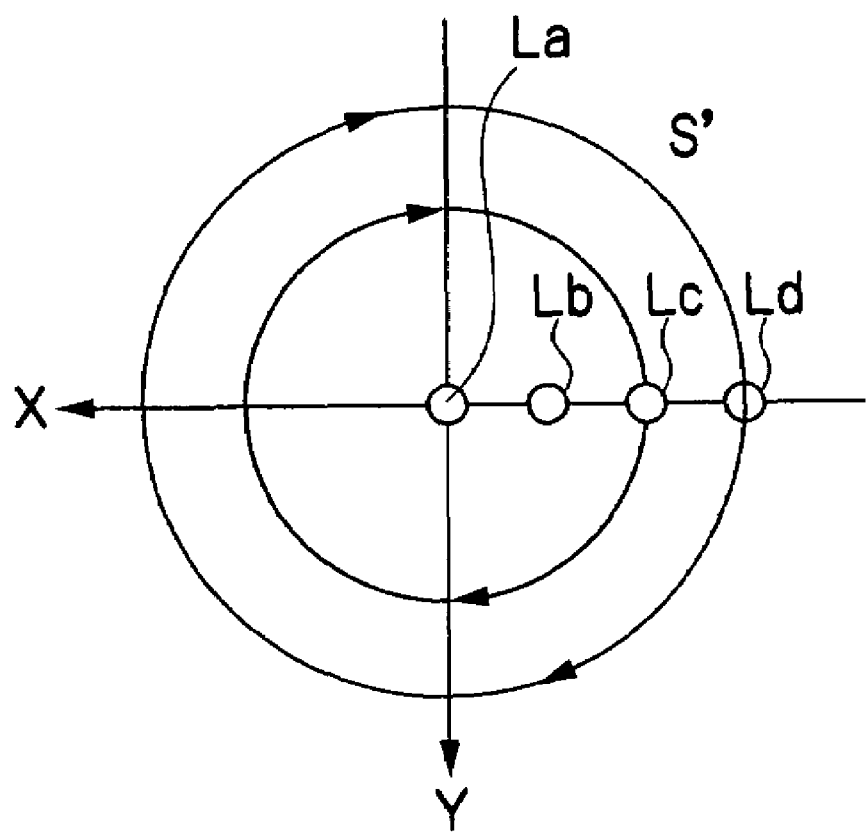
FIG. 7 is an explanatory view showing a locus on a surface S' orthogonal to a rotation axis of the spinner mirror apparatus, of a laser beam polarized by a light polarization portion polarizing in a direction of an X axis and a direction of a Y axis which is used in the inner drum exposure apparatus in accordance with the second embodiment of the invention.

As a result, the light beams introduced to the reflection mirror surface 18A of the spinner mirror apparatus 16, polarized and coaxially combined, output from the third and fourth semiconductor laser light sources 230C and 230D draw an approximately circular track on a surface S' orthogonal to the rotation shaft 18 of the spinner mirror apparatus 16 as shown in FIG. 7, in synchronous with the rotational motion of the spinner mirror apparatus 16, in a state of being divided based on the effects of the quarter wave plate 107, the quarter wave plate 226 and the optical element 228 of the uniaxial crystal.

Next, a description will be given of the functioning and operation of the inner drum exposure apparatus 10 in accordance with the present second embodiment structured in the manner mentioned above.

In the inner drum exposure apparatus 10 in accordance with the present second embodiment, the first laser beam La, which is modulated in the light intensity and output in correspondence to the image information from the first semiconductor laser light source 230A controlled by the central control unit (not shown) and the laser driver, is changed to the parallel beam by the collimating lens (the collimator lens) 232 so as to be passed through the parallel flat plate 236, and is thereafter input to the polarized light beam splitter 238. At this time, since the first laser beam La forms p-polarized light with respect to the reflection surface of the polarized light beam splitter 238, the first laser beam La proceeds through the polarized light beam splitter 238.

Further, the second laser beam Lb, which is modulated in the light intensity and output in correspondence to the image information by the second semiconductor laser light source 230B, is formed as the parallel beam by the collimating lens (the collimator lens) 234, formed as s-polarized light by passing through the quarter wave plate 244 so as to be rotated by 90 degrees in the direction of polarization, and thereafter input to the polarized light beam splitter 238.

Further, the second laser beam Lb is formed as s-polarized light so as to be reflected by the reflection surface of polarized light beam splitter 238, is polarized and coaxially combined with the first laser beam La, and passes through the quarter wave plate 107 while passing through the second focusing lens 102, the transmission portion 110 of the partial optical function member 104 and the third focusing lens 106 on light path. The polarized and coaxially combined first laser beam La and second laser beam Lb are respectively converted into right circular polarized light and left circular polarized light at a time of passing through the quarter wave plate 107, pass through the -fourth focusing lens 108 for forming the focal point on the scanning surface, and are introduced to the spinner mirror apparatus 16 of the scanning optical system provided with the quarter wave plate 226 and the optical element 228 of the uniaxial crystal.

Further, the first laser beam La and the second laser beam Lb respectively converted into the right circular polarized light and the left circular polarized light are converted into the mutually orthogonal liner polarized light beams so as to be input to the optical element 228 of the uniaxial crystal at a time of passing through the quarter wave plate 226 of the scanning optical system, and are divided so as to shift in parallel in the sub-scanning direction providing two mutually orthogonal linear polarized light beams. Thereafter, the laser beams La and Lb are introduced along the rotation axis of the spinner mirror apparatus 16, and are reflected and polarized by the reflection mirror surface 18A so as to be introduced to the recording medium 14.

At the same time, in the inner drum exposure apparatus 10, the third laser beam Lc modulated and output in correspondence to the image information from the third semiconductor laser light source 230C controlled by the central control unit and the laser driver is changed to a parallel beam by the collimating lens (the collimator lens) 232 so as to be passed through the parallel flat plate 236, and is thereafter input to the polarized light beam splitter 238. At this time, since the third laser beam Lc forms p-polarized light with respect to the reflection surface of the polarized light beam splitter 238, the first laser beam La proceeds through the polarized light beam splitter 238.

Further, the fourth laser beam Ld, which is modulated and output in correspondence to the image information by the fourth semiconductor laser light source 230D, is formed as a parallel beam by the collimating lens (the collimator lens) 234, formed as s-polarized light by passing through the half wave plate 244 so as to be rotated by 90 degrees in the direction of polarization, and thereafter input to the polarized light beam splitter 238.

Further, the fourth laser beam Ld is formed as s-polarized light so as to be reflected by the reflection surface of polarized light beam splitter 238, polarized and coaxially combined with the third laser beam Lc, and proceeds on the light path. Further, the polarized and coaxially combined third laser beam Lc and fourth laser beam Ld are reflected by the reflection mirror 114 on the light path, polarized in the X direction by the acousto-optic element 116 serving as the light polarizing portion, and thereafter polarized in the Y direction by the acousto-optic element 118 serving as the light polarizing portion.

Further, the polarized and coaxially combined third laser beam Lc and fourth laser beam Ld are reflected by the reflection portion 111 of the partial optical function member 104 after being focused by the second focusing lens 120, pass through the third focusing lens 106 in the light source side optical system, and pass through the quarter wave plate 107. The polarized and coaxially combined third laser beam Lc and fourth laser beam Ld are respectively converted into the right circular polarized light and the left circular polarized light at a time of passing through the quarter wave plate 107, pass through the fourth focusing lens 108 for forming the focal point on the scanning surface, and are introduced to the spinner mirror apparatus 16 of the scanning optical system provided with the quarter wave plate 226 and the optical element 228 of the uniaxial crystal.

Further, the third laser beam Lc and the fourth laser beam Ld converted into the right circular polarized light and the left circular polarized light are converted into mutually orthogonal liner polarized light beams so as to be input to the optical element 228 of the uniaxial crystal at a time of passing through the quarter wave plate 226 of the scanning optical system, and are divided so as to shift in parallel in the sub-scanning direction providing two mutually orthogonal linear polarized light beams. Thereafter, the laser beams Lc and Ld are introduced along the straight line apart from the rotation axis of the spinner mirror apparatus 16 at a predetermined interval, and are reflected and polarized by the reflection mirror surface 18A so as to be introduced to the recording medium 14.

In other words, in accordance with the inner drum exposure apparatus 10, since the first, second, third and fourth laser beams La, Lb, Lc and Ld respectively modulated and emitted from the first, second, third and fourth semiconductor laser light sources 230A, 230B, 230C and 230D are simultaneously irradiated on the recording medium 14 so as to be exposed, it is possible to effectively and rapidly execute the exposure process.

Next, a description will be given of a method for economically executing the exposure process by switching the resolution, in the inner drum exposure apparatus 10 provided with the four multi-beam exposure system.

For example, a description will be given of the case that the resolution is switched between 1200 dpi and 1270 dpi, between 2400 dpi and 2540 dpi and between 3600 dpi and 3810 dpi, with reference to FIG. 4.

The diameters of the beam spots a, b, c and d are varied in correspondence to the respective resolutions, in the optical system before being input to the spinner mirror apparatus 16. Further, in the inner drum exposure apparatus 10, the speed of moving the spinner mirror apparatus 16 in the sub-scanning direction in correspondence to the resolution is changed and adjusted in correspondence to the resolution.

Figure 4:
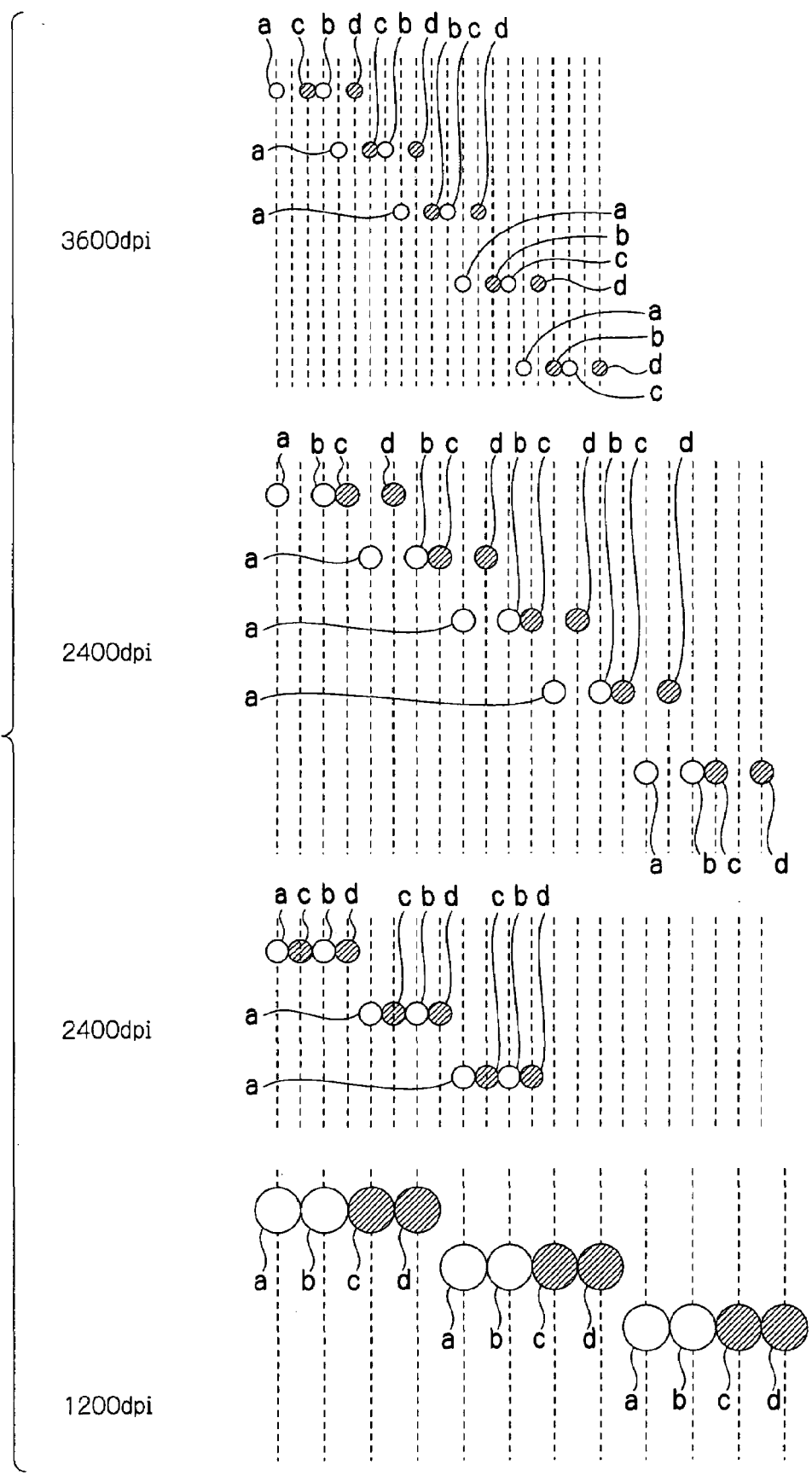
FIG. 4 is an explanatory view showing a method for switching resolution so as to reasonably execute an exposure process, in the inner drum exposure apparatus in accordance with the second embodiment of the invention.

When recording with a resolution of 1200 dpi (1200 dpi to 1270 dpi), in the inner drum exposure apparatus 10 exposing by four beams, the apparatus exposes in a state of 1200 dpi shown at the bottom in FIG. 4, by controlling the acousto-optic element 116 and the acousto-optic element 118, thereby setting the shifted amount of the laser beams Lc and Ld relative to the laser beams La and Lb in the sub-scanning direction on the scanning surface to two pixels (42.3 μm) while adding a small polarization. In other words, four beam spots a, b, c and d (the first, second, third and fourth beam spots) exposed by four laser beams La, Lb, Lc and Ld are exposed in a state of being arranged in one line at a uniform interval.

Further, when exposing with a the resolution of 2400 dpi (2400 dpi to 2540 dpi), the apparatus exposes in a state of 2400 dpi shown at the second from the top in FIG. 4, by controlling the acousto-optic element 116 and the acousto-optic element 118, thereby setting the shifted amount in the sub-scanning direction on the scanning surface to three pixels (31.75 μm) while adding a small polarization.

In other words, when exposing by the resolution of 2400 dpi, the interval between adjacent beam spots b and c is set to one pixel in 2400 dpi, by controlling the acousto-optic element 116 and the acousto-optic element 118. In addition, the apparatus exposes in such a manner as to fill the gap between the beam spots c and d in which the exposed interval is formed at the first time, by the beam spot a exposed at the second time.

Further, the exposure is executed such that the unexposed position existing between the beams spots c and d at a time of the second exposure is filled with the beam spot a exposed at the third time. In above mentioned manner, the entire of the recording medium 14 is exposed. In this case, it goes without saying that the respective beam spots a, b, c and d are exposed by the laser beams La, Lb, Lc and Ld which are modulated in correspondence to the desired image information.

Further, when exposing by the resolution of 2400 dpi (2400 dpi to 2540 dpi), it is possible to expose in the manner of another aspect at 2400 dpi as shown in the third diagram from the top of FIG. 4.

When exposing by the resolution of 2400 dpi in accordance with the other aspect, the exposure process is executed by shifting the predetermined beam spot at one pixel, by controlling the acousto-optic element 116 and the acousto-optic element 118, in such a manner that the beam spot enters between the beam port a and the beam spot b, and the beam spot d is arranged beside the beam spot b. In the case of executing the exposure process in the manner mentioned above, since each of the beam spots a, b, c and d is repeatedly exposed, it is not necessary to execute an interlace recording such as the case of exposing by 2400 dpi shown in the second diagram from the top in FIG. 4 mentioned above.

Further, when exposing by the resolution of 3600 dpi (3600 dpi to 3810 dpi), the exposure is executed in a manner of 3600 dpi as shown in FIG. 4, by controlling the acousto-optic element 116 and the acousto-optic element 118 so as to apply the small polarization and set the shifted amount in the sub-scanning direction on the scanning surface to two pixels (14.1 μm).

In other words, when exposing by the resolution of 3600 dpi, the interval between the adjacent beam spots b and c is set to one pixel in 3600 dpi, by controlling the acousto-optic element 116 and the acousto-optic element 118. In addition, a portion between the beam spots c and d in which the exposed interval is formed at the first time is exposed by filling in with the beam spot a exposing at the second time.

Further, the exposure is executed such that the unexposed position existing between the beams spots c and d at a time of the second exposure is filled with the beam spot a exposed at the third time. In this manner, the entirety of the recording medium 14 is exposed. In this case, it goes without saying that the respective beam spots a, b, c and d are exposed by the laser beams La, Lb, Lc and Ld which are modulated in correspondence to the desired image information.

Next, a description will be given of another structural embodiment for executing the exposure process by executing the beam division and main-scanning on the recording surface of the recording medium 14, in the inner drum exposure apparatus 10 in accordance with the first embodiment and the second embodiment, with reference to FIG. 9. In this FIG. 9, there is shown a structure corresponding to the inner drum exposure apparatus 10 in accordance with the second embodiment. In this case, in the inner drum exposure apparatus 10 in accordance with the first embodiment, the structure relating to the two laser beams La and Lb shown in FIG. 9 is the same as above, a description thereof will not be given.

As shown in FIG. 9, in the inner drum exposure apparatus 10, a half wave plate 246 serving as a polarized light control element, and an optical element 248 of a uniaxial crystal are installed with respect to the holder 24 firmly fixed to the rotational axis member 18 of the spinner mirror apparatus 16, following the quarter wave plate 226 and the optical element 228 of the uniaxial crystal. In this case, although an illustration is not shown, the quarter wave plate 226, the optical element 228 of uniaxial crystal, the half wave plate 246 and the optical element 248 of uniaxial crystal are structured in such a manner as to be integrally rotated with the reflection mirror surface 18A.

In the inner drum exposure apparatus 10 structured in the above mentioned manner, for example, the set of the first laser beam La and the second laser beam Lb which are respectively coaxially combined from the light source side optical system so as to be converted into the right circular polarized light and the left circular polarized light, and the set of the third laser beam Lc and the fourth laser beam Ld which are converted into the right circular polarized light and the left circular polarized light, are converted into linear polarized light beams which are orthogonal to each other, at a time of passing through the quarter wave plate 226 of the scanning optical system, and are respectively divided into the set of the first laser beam La and the second laser beam Lb, and the set of the third laser beam Lc and the fourth laser beam Ld, in the sub-scanning direction at a time of passing through the optical element 228 of uniaxial crystal.

Further, the set of the first laser beam La and the second laser beam Lb which are divided in the sub-scanning direction, and the set of the third laser beam Lc and the fourth laser beam Ld are rotated by 45 degrees in the polarizing direction at a time of passing through the half wave plate 246 serving as the polarization control element, the first laser beam La and the third laser beam Lc are divided at approximately a uniform light intensity in the sub-scanning direction, at a time of passing through the second optical element 248 of the second uniaxial crystal serving as the dividing element, and the second laser beam Lb and the fourth laser beam Ld are divided approximately at a uniform light intensity in the sub-scanning direction.

Also, in the inner drum exposure apparatus, although not illustrated, the structure may be made such as to change the first laser beam and the second laser beam, which are arranged on the light path and are divided in the sub-scanning direction by a first quarter wave plate and the first optical element of the uniaxial crystal respectively, to circular polarized lights by a second quarter wave plate serving as a polarization control element arranged on the downstream side of the light path from the first optical element of the uniaxial crystal, and divide the light beams respectively changed to circular polarized light by a second optical element of uniaxial crystal serving as division element arranged on the downstream side of the light path, at a uniform light intensity in the sub-scanning direction.

In the inner drum exposure apparatus 10 structured in the manner mentioned above, it is possible to obtain a shape closer to a rectangular shape with respect to the sub-scanning direction, and it is possible to obtain a sharp spot shape drawn with respect to the main-scanning direction (the edge portion of the beam spot is a sharp state), by making the diameter of the focused spot of the light beam before being divided at the uniform light intensity in the sub-scanning direction of each of the laser beams smaller than the recording pixel, and setting the division width of the second optical element 248 of the second uniaxial crystal serving as the division element at approximately half pixel. Accordingly, it is possible to improve a quality of the recording pixel.

What is claimed is:

1. An inner drum exposure apparatus comprising:
    a light source side optical system for polarizing and combining two laser beams emitted from the light source side, each independently modulated based on an image signal, by using a polarized light beam splitter, and for changing said two laser beams to right circular polarized light and left circular polarized light so as to be emitted toward a reflection surface of a light deflector serving as a scanning portion;
    a quarter wave plate integrally arranged on the rotation axis of said light deflector provided with the reflection surface, for converting said two laser beams constituted by right circular polarized light and left circular polarized light input from said light source side optical system into mutually orthogonal linear polarized light;
    an optical element of uniaxial crystal that is integrally arranged on the rotation axis of said light deflector provided with the reflection surface, and emits said two laser beams converted into mutually orthogonal linear polarized light by said quarter wave plate at different respective positions enabling switching resolution within a narrow range of 10% or less, whereby a division width D3 of beam spots in a sub-scanning direction on a scanning surface is set according to the following expression:

$$D3 = (D1 + D2)/2 \pm D4$$

wherein an interval of first beam spots corresponding to a first resolution is D1, an interval of second beam spots corresponding to a second resolution is D2 at a time of switching resolution within a narrow range of 10% or less, and a design tolerance in the sub-scanning direction is D4; and a sub-scan moving portion controlling so as to move said scanning portion in correspondence to the resolution.

2. An inner drum exposure apparatus comprising:

a light source side optical system for polarizing and combining two laser beams emitted from the light source side, each independently modulated based on an image signal, by using a polarized light beam splitter, and for changing said two laser beams to right circular polarized light and left circular polarized light so as to be emitted toward a reflection surface of a light deflector serving as a scanning portion;

a quarter wave plate integrally arranged on the rotation axis of said light deflector provided with the reflection surface, for converting said two laser beams constituted by right circular polarized light and left circular polarized light input from said light source side optical system into mutually orthogonal linear polarized light;

an optical element of uniaxial crystal that is integrally arranged on the rotation axis of said light deflector provided with the reflection surface, formed by a prism-like quartz plate, and that divides said two laser beams converted into mutually orthogonal linear polarized lights by said quarter wave plate and emits an ordinary ray and an extraordinary ray in different angular directions enabling switching resolution within a narrow range of 10% or less, whereby a division width D3 of beam spots in a sub-scanning direction on a scanning surface is set according to the following expression:

$$D3=(D1+D2)/2 \pm D4$$

wherein an interval of first beam spots corresponding to a first resolution is D1, an interval of second beam spots corresponding to a second resolution is D2 at a time of switching the resolution within a narrow range of 10% or less, and design tolerance in the sub-scanning direction is D4; and a sub-scan moving portion controlling so as to move said scanning portion in correspondence to the resolution.

3. The inner drum exposure apparatus according to claim 1, wherein the division width D3 of the beam spots on the scanning surface in the sub-scanning direction by said optical element of uniaxial crystal is set to 10.3 μm±0.3 μm.

4. The inner drum exposure apparatus according to claim 2, wherein the division width D3 of the beam spots on the scanning surface in the sub-scanning direction by said optical element of uniaxial crystal is set to 10.3 μm±0.3 μm.

5. The inner drum exposure apparatus according to claim 1, wherein said exposure apparatus is structured such as to expose the same image information by two laser beams divided by said optical element of uniaxial crystal in: a state of executing an exposure process at a resolution of $2R_0$dpi, in the case that the standard resolution is set to $2R_0$dpi; and when a recording is executed by changing the resolution from $2R_0$dpi to $R_0$dpi.

6. The inner drum exposure apparatus according to claim 2, wherein said exposure apparatus is structured such as to expose the same image information by two laser beams divided by said optical element of uniaxial crystal in: a state of executing an exposure process at a resolution of $2R_0$dpi, in the case that the standard resolution is set to $2R_0$dpi; and when a recording is executed by changing the resolution from $2R_0$dpi to $R_0$dpi.

7. An inner drum exposure apparatus comprising:

a light source side optical system for polarizing, combining, and emitting two laser beams emitted from the light source side, each independently modulated based on an image signal, by using a polarized light beam splitter;

a light deflecting portion arranged so as to deflection control a light beam on a light path of at least one said optical system in a plurality of said light source side optical systems;

a combining member for combining a plurality of said light beams emitted from a plurality of said light source side optical systems, based on an effect of: reflecting a part of at least one of (a) the light beam deflection controlled by said light deflecting portion or (b) said other light beams emitted from the plurality of said light source side optical systems other than said deflection controlled light beam; and transmitting a part of said other light beam, (a) or (b);

a light deflector for executing scanning exposure by forming images of a plurality of said light beams, combined by said combining member, on a recording medium mounted on a support body of the inner drum and at a predetermined interval from each other in the sub-scanning direction;

at least one first quarter wave plate for converting a linear polarized light into right or left circular polarized light before being scanned by said light deflector, arranged at a rear side of said polarized light beam splitter;

a second quarter wave plate that is arranged on a rotation axis of said light deflector provided with a reflection surface, and converts a laser beam obtained by coaxially combining the input right circular polarized light and left circular polarized light into mutually orthogonal linear polarized lights;

an optical element of uniaxial crystal integrally arranged on the rotation axis of said light deflector provided with the reflection surface, and in which a division width D3, of beam spots in a sub-scanning direction on a scanning surface at a time of forming images of said two laser beams converted into mutually orthogonal linear polarized lights by said second quarter wave plate, is at a predetermined interval on said recording medium, for enabling the switching of resolution within a narrow range of 10% or less according to the following expression:

$$D3=(D1+D2)/2 \pm D4$$

wherein an interval of first beam spots corresponding to a first resolution is D1, an interval of second beam spots corresponding to a second resolution is D2 at a time of switching the resolution within a narrow range of 10% or less is D2, and design tolerance in the sub-scanning direction is D4; and a sub-scan moving portion controlling so as to move said light deflector in correspondence to the resolution.

8. The inner drum exposure apparatus according to claim 7, wherein the division width D3 of the beam spots on the scanning surface in the sub-scanning direction by said optical element of the uniaxial crystal is set to 20.6 μm±0.2 μm.

9. An inner drum exposure apparatus comprising:

a light source side optical system for polarizing, combining, and emitting two laser beams emitted from the light source side, each independently modulated based on an image signal, by using a polarized light beam splitter, thereby emitting;

a light deflecting portion arranged so as to deflection control a light beam on a light path of at least one said optical system in a plurality of said light source side optical systems;

a focusing lens for focusing the light beam deflection controlled by said light deflecting portion;

a focusing lens for focusing the light beams emitted from a plurality of said light source optical systems other than said deflection controlled light beam;

a partial optical function member arranged such that a focused position of the light beam deflection controlled by said light deflecting portion, and a focused position of a light beam emitted from the plurality of said light source side optical systems other than said deflection controlled light beam correspond to a reflection portion and a transmission portion of the partial function member which are set at different positions, reflecting at least one light beam by said reflection portion, and passing the other light beam by said transmission portion, thereby setting such that a light path of the light beam emitted from the plurality of said light source side optical systems other than said deflection controlled light beams, and a light path of said deflection controlled light beam are input to the scanning portion in a state of being parallel;

a light deflector for executing a scanning exposure by forming images of the plurality of said light beams input through the light paths set by said partial optical function member on a recording medium mounted on a support body of an inner drum, at a predetermined interval to each other in the sub-scanning direction;

at least one first quarter wave plate for converting a linear polarized light into right or left circular polarized light before being scanned by said light deflector, arranged at a rear side of said polarized light beam splitter;

a second quarter wave pate that is arranged on a rotation axis of said light deflector provided with a reflection surface, and converts a laser beam obtained by coaxially combining input right circular polarized light and left circular polarized light into mutually orthogonal linear polarized lights;

an optical element of uniaxial crystal integrally arranged on the rotation axis of said light deflector provided with the reflection surface, and in which a division width D3, of beam spots in a sub-scanning direction on a scanning surface at a time of forming images of said two laser beams converted into mutually orthogonal linear polarized lights by said second quarter wave plate at a predetermined interval on said recording medium, for enabling the switching of resolution within a narrow range of 10% or less, is set according to the following expression:

$$D3 = (D1+D2)/2 \pm D4$$

wherein an interval of first beam spots corresponding to a first resolution is D1, an interval of second beam spots corresponding to a second resolution is D2 at a time of switching the resolution within a narrow range of 10% or less, and design tolerance in the sub-scanning direction is D4; and a sub-scan moving portion controlling so as to move said light deflector in correspondence to the resolution.

10. The inner drum exposure apparatus according to claim 1, further comprising:

a polarized light control element for controlling a polarizing direction of each of the light beams at a downstream side of the light path from said optical element of uniaxial crystal; and a division element for dividing each of the light beams passing through said polarized light control element in the sub-scanning direction, wherein each of the light beams is divided approximately at a uniform light intensity in the sub-scanning direction, by said polarized light control element and said division element.

11. The inner drum exposure apparatus according to claim 2, further comprising:

a polarized light control element for controlling a polarizing direction of each of the light beams at a downstream side of the light path from said optical element of uniaxial crystal; and a division element for dividing each of the light beams passing through said polarized light control element in the sub-scanning direction, wherein each of the light beams is divided approximately at a uniform light intensity in the sub-scanning direction, by said polarized light control element and said division element.

12. The inner drum exposure apparatus according to claim 7, further comprising:

a polarized light control element for controlling a polarizing direction of each of the light beams at a downstream side of the light path from said optical element of uniaxial crystal; and a division element for dividing each of the light beams passing through said polarized light control element in the sub-scanning direction, wherein each of the light beams is divided approximately at a uniform light intensity in the sub-scanning direction, by said polarized light control element and said division element.

13. The inner drum exposure apparatus according to claim 9, further comprising:

a polarized light control element for controlling a polarizing direction of each of the light beams at a downstream side of the light path from said optical element of uniaxial crystal; and a division element for dividing each of the light beams passing through said polarized light control element in the sub-scanning direction, wherein each of the light beams is divided approximately at a uniform light intensity in the sub-scanning direction, by said polarized light control element and said division element.

14. The inner drum exposure apparatus according to claim 1, further comprising:

a quarter wave plate that is arranged at a downstream side of the light path from said optical element of the uniaxial crystal, and polarizes each of the light beams divided into mutually orthogonal linear polarized light into right circular polarized light and left circular polarized light; and a uniaxial crystal that is arranged at a downstream side of the light path from said optical element of uniaxial crystal, and divides each of the right circular polarized light beam and the left circular polarized light beam approximately at a uniform light intensity in the sub-scanning direction.

15. The inner drum exposure apparatus according to claim 2, further comprising:
 a quarter wave plate that is arranged at a downstream side of the light path from said optical element of uniaxial crystal, and polarizes each of the light beams divided into mutually orthogonal linear polarized light into right circular polarized light and left circular polarized light; and
 a uniaxial crystal that is arranged at a downstream side of the light path from said optical element of uniaxial crystal, and divides each of the right circular polarized light beam and the left circular polarized light beam approximately at a uniform light intensity in the sub-scanning direction.

16. The inner drum exposure apparatus according to claim 3, further comprising:
 a quarter wave plate that is arranged at a downstream side of the light path from said optical element of the uniaxial crystal, and polarizes each of the light beams divided into the mutually orthogonal linear polarized light into right circular polarized light and left circular polarized light; and
 a uniaxial crystal that is arranged at a downstream side of the light path from said optical element of uniaxial crystal, and divides each of the right circular polarized light beam and the left circular polarized light beam approximately at a uniform light intensity in the sub-scanning direction.

17. The inner drum exposure apparatus according to claim 4, further comprising:
 a quarter wave plate that is arranged at a downstream side of the light path from said optical element of uniaxial crystal, and polarizes each of the light beams divided into the mutually orthogonal linear polarized light to right circular polarized light and left circular polarized light; and
 a uniaxial crystal that is arranged at a downstream side of the light path from said optical element of the uniaxial crystal, and divides each of the right circular polarized light beam and the left circular polarized light beam approximately at a uniform light intensity in the sub-scanning direction.

* * * * *